(12) United States Patent
Nakamura et al.

(10) Patent No.: US 8,673,222 B2
(45) Date of Patent: Mar. 18, 2014

(54) HYDROGEN GENERATOR AND METHOD FOR OPERATING THE SAME

(75) Inventors: Akinari Nakamura, Shiga (JP); Takayuki Urata, Shiga (JP); Shigeki Yasuda, Osaka (JP); Akinori Yukimasa, Osaka (JP)

(73) Assignee: Panasonic Corporation, Osaka (JP)

( * ) Notice: Subject to any disclaimer, the term of this patent is extended or adjusted under 35 U.S.C. 154(b) by 350 days.

(21) Appl. No.: 13/128,737

(22) PCT Filed: May 18, 2010

(86) PCT No.: PCT/JP2010/003333
§ 371 (c)(1),
(2), (4) Date: May 11, 2011

(87) PCT Pub. No.: WO2010/143358
PCT Pub. Date: Dec. 16, 2010

(65) Prior Publication Data
US 2011/0223099 A1  Sep. 15, 2011

(30) Foreign Application Priority Data
Jun. 11, 2009  (JP) .................. 2009-139745

(51) Int. Cl.
*G05D 7/00* (2006.01)
*B01J 8/00* (2006.01)

(52) U.S. Cl.
USPC ........... 422/111; 422/625; 422/629; 422/110; 48/61

(58) Field of Classification Search
USPC ................ 422/625, 629, 110, 111; 48/61
See application file for complete search history.

(56) References Cited

U.S. PATENT DOCUMENTS

| | | | |
|---|---|---|---|
| 2005/0132649 A1 | 6/2005 | Tamura et al. | |
| 2009/0087701 A1 | 4/2009 | Kuwaba | |
| 2010/0183928 A1* | 7/2010 | Fujihara et al. | ............... 429/423 |

FOREIGN PATENT DOCUMENTS

| | | | |
|---|---|---|---|
| CN | 1624965 | A | 6/2005 |
| EP | 2172420 | A1 | 4/2010 |
| JP | 2004-307236 | A | 11/2004 |
| JP | 2004-349093 | A | 12/2004 |
| JP | 2005-082409 | A | 3/2005 |
| JP | 2006-167501 | A | 6/2006 |
| JP | 2007-331951 | A | 12/2007 |
| JP | 2008-308351 | A | 12/2008 |
| WO | WO 2009/011098 | A1 | 1/2009 |

OTHER PUBLICATIONS

International Search Report for International Application No. PCT/JP2010/003333, dated Aug. 3, 2010, 2 pages.
Extended European Search Report for European Application No. 10785890.4, dated Feb. 8, 2013, 9 pages.

\* cited by examiner

*Primary Examiner* — Lessanework Seifu
(74) *Attorney, Agent, or Firm* — Brinks Gilson & Lione

(57) ABSTRACT

A hydrogen generator of the present invention includes: a reformer (1) including a reforming catalyst (1A) containing nickel and configured to generate a hydrogen-rich fuel gas by using a raw material and steam; a temperature detector (12) configured to detect a temperature of the reforming catalyst (1A); a purge gas supplying device (7) configured to supply a purge gas to the reformer (1); and a controller (13). When the temperature detected by the temperature detector (12) is a first predetermined temperature or higher, the controller (13) purges the reformer (1) with the purge gas supplied from the purge gas supplying device (7).

18 Claims, 9 Drawing Sheets

HYDROGEN GENERATOR AND METHOD FOR OPERATING THE SAME

This application is a 371 application of PCT/JP2010/003333 having an international filing date of May 18, 2010, which claims priority to JP2009-139745 filed on Jun. 11, 2009, the entire contents of which are incorporated herein by reference.

TECHNICAL FIELD

The present invention relates to a hydrogen generator configured to generate a hydrogen-rich fuel gas from a raw material and steam by using a reforming catalyst containing nickel and a method for operating the hydrogen generator.

BACKGROUND ART

Known as a conventional hydrogen generator configured to prevent a reforming catalyst from deteriorating while the hydrogen generator is not operating is a hydrogen generator configured to supply a raw material gas to a reformer when the temperature of the reformer becomes a predetermined temperature or lower to purge a reformed gas (see PTL 1, for example). FIG. 4 is a schematic diagram showing the conventional hydrogen generator described in PTL 1.

In FIG. 4, the conventional hydrogen generator includes: a reformer 101 configured to generate a hydrogen-rich fuel gas by using a raw material gas and water; a burner 102 configured to heat the reformer 101; a raw material gas on-off valve 103 configured to supply and stop supplying the raw material; and a fuel gas on-off valve 104 configured to supply and stop supplying the fuel gas discharged from the reformer 101. The temperature of a catalyst of the reformer 101 is increased to and maintained at 600° C. or higher by combustion of the burner 102, and stable steam reforming is carried out in the reformer 101.

While the hydrogen generator is not operating, the raw material gas on-off valve 103 and the fuel gas on-off valve 104 are closed, the supply of the raw material gas and the supply of the water are stopped, and the inside of the reformer 101 is filled with the reformed gas that is a reducing gas. When the reformer 101 becomes a predetermined temperature or lower, the raw material gas on-off valve 103 and the fuel gas on-off valve 104 open, and the raw material gas is supplied to the reformer 101 to purge the reformed gas. After the purge, the raw material gas on-off valve 103 and the fuel gas on-off valve 104 are closed. Thus, the inside of the reformer 101 is filled with the raw material gas. Here, the above-described "predetermined temperature" is a temperature at which a decomposition reaction of hydrocarbon does not proceed and carbon deposition due to the decomposition reaction does not occur. For example, if the hydrocarbon is methane, the predetermined temperature is from about 600° C. to 400° C. If the hydrocarbon is the city gas, the predetermined temperature is lower than the predetermined temperature in the case of methane. This is because the city gas contains hydrocarbon including two or more carbons. Specifically, the predetermined temperature in this case is set based on, for example, a preliminary experiment.

PTL 1: Japanese Laid-Open Patent Application Publication No. 2004-307236 (pages 4-6, FIG. 1)

SUMMARY OF THE INVENTION

Technical Problem

In the conventional hydrogen generator, a common catalyst containing ruthenium is used as the reforming catalyst. Therefore, although PTL 1 describes an upper limit temperature for performing the purge of the reformed gas, it does not technically describe a lower limit temperature. From the viewpoint of the cost reduction of the reforming catalyst, the reforming catalyst containing nickel will be used from now.

In the case of using the nickel-containing reforming catalyst in the above-described hydrogen generator and carrying out a stop operation of the hydrogen generator, the reformed gas remains in the reformer 101, and the reformed gas contains about 10% carbon monoxide. Therefore, especially in a case where the reformed gas is purged after the temperature in the reformer 101 is lowered up to a temperature (for example, 100° C.) at which a generation speed of generating a compound of the nickel and the carbon monoxide is higher than a decomposition speed of decomposing the compound, the compound of the nickel and the carbon monoxide is discharged together with the reformed gas. As a result, since the nickel is discharged to the outside of the hydrogen generator, the amount of nickel in the reforming catalyst decreases, and this causes the performance degradation of the reforming catalyst.

The present invention was made to solve the above conventional problems, and an object of the present invention is to provide a hydrogen generator configured to purge a reformer including a reforming catalyst containing nickel at a good time to suppress the performance degradation of the reforming catalyst, and a method for operating the hydrogen generator.

Solution to Problem

To solve the above-described conventional problems, a hydrogen generator according to the present invention includes: a reformer including a reforming catalyst containing nickel and configured to generate a hydrogen-rich fuel gas by using a raw material and steam; a temperature detector configured to detect a temperature of the reforming catalyst; a purge gas supplying device configured to supply a purge gas to the reformer; and a controller, wherein when the temperature detected by the temperature detector is a first predetermined temperature or higher, the controller purges the reformer with the purge gas supplied from the purge gas supplying device.

In accordance with this configuration, the reformer can be purged with the purge gas when the reforming catalyst temperature detected by the temperature detector is the first predetermined temperature or higher which is a predetermined temperature range in which the performance of the reforming catalyst containing nickel does not deteriorate.

Moreover, a method for operating a hydrogen generator according to the present invention is a method for operating a hydrogen generator including: a reformer including a reforming catalyst containing nickel and configured to generate a hydrogen-rich fuel gas by using a raw material and steam; a temperature detector configured to detect a temperature of the reforming catalyst; and a purge gas supplying device configured to supply a purge gas to the reformer, the method comprising the steps of: (A) detecting the temperature of the reforming catalyst by the temperature detector; (B) determining whether or not the temperature detected by the temperature detector is the first predetermined temperature or higher; and (C) supplying the purge gas by the purge gas supplying device to the reformer when it is determined in Step (B) that the temperature detected by the temperature detector is the first predetermined temperature or higher.

The above object, other objects, features and advantages of the present invention will be made clear by the following detailed explanation of preferred embodiments with reference to the attached drawings.

Advantageous Effects of Invention

In accordance with the hydrogen generator of the present invention, the performance deterioration of the reforming catalyst can be suppressed by purging the reformer with the purge gas when the temperature of the reforming catalyst is the first predetermined temperature or higher.

DETAILED DESCRIPTION OF THE PREFERRED EMBODIMENTS

Figure 1:
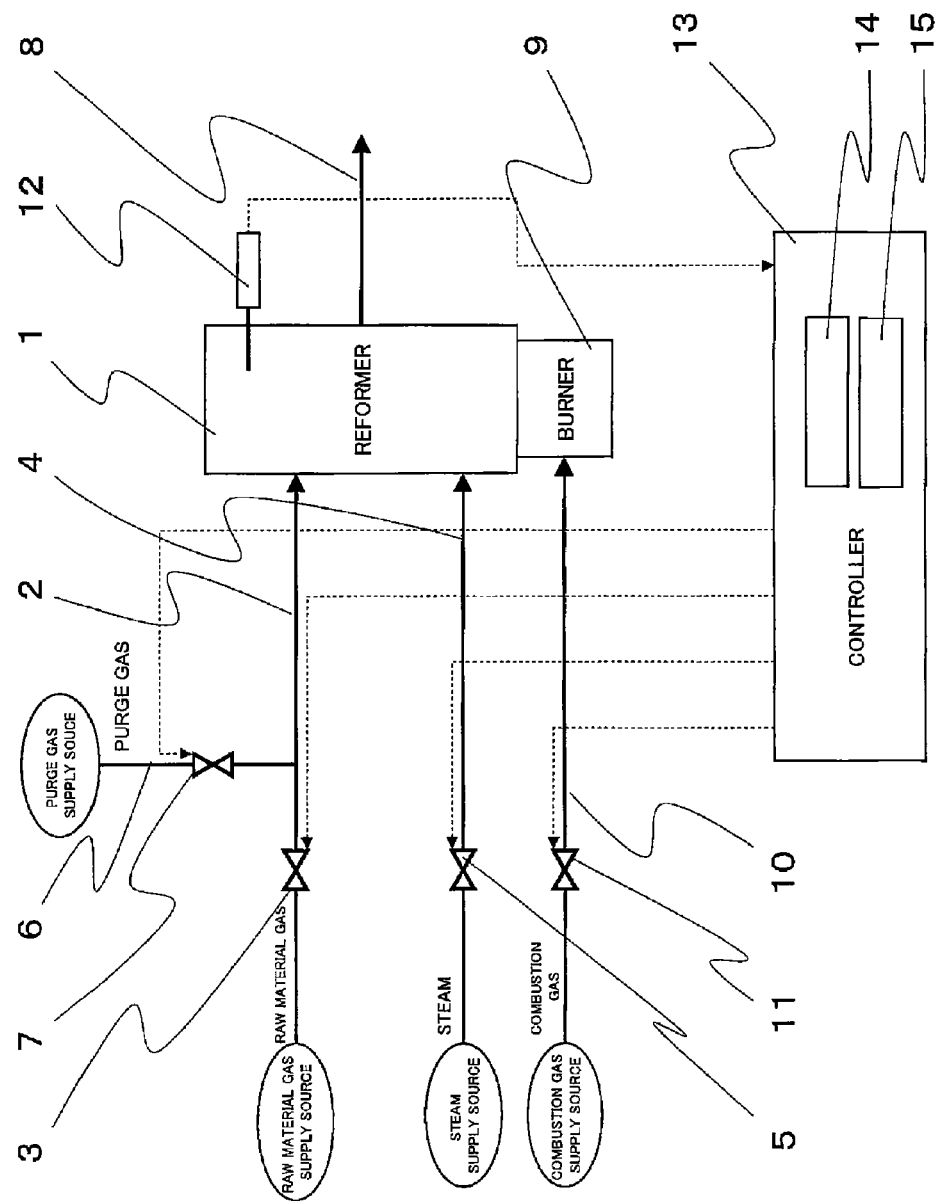
FIG. 1 is a block diagram showing the configuration of a hydrogen generator in Embodiment 1 of the present invention.

A first aspect of the present invention is a hydrogen generator including: a reformer including a reforming catalyst containing nickel and configured to generate a hydrogen-rich fuel gas by using a raw material and steam; a temperature detector configured to detect a temperature of the reforming catalyst; a purge gas supplying device configured to supply a purge gas to the reformer; and a controller, wherein when the temperature detected by the temperature detector is a first predetermined temperature or higher, the controller purges the reformer with the purge gas supplied from the purge gas supplying device. In accordance with this configuration, the reformer can be purged with the purge gas when the reforming catalyst temperature detected by the temperature detector is the first predetermined temperature or higher that is a predetermined temperature range in which the performance of the reforming catalyst containing the nickel does not deteriorate.

A second aspect of the present invention is the hydrogen generator according to the first aspect of the present invention, wherein the first predetermined temperature is a temperature at which a decomposition speed of decomposing a compound of the nickel and carbon monoxide contained in a fuel gas is higher than a generation speed of generating the compound. In accordance with this configuration, in addition to the effect of the first aspect of the present invention, the reformer can be purged with the purge gas before the reforming catalyst temperature detected by the temperature detector practically decreases up to a temperature at which the compound of the nickel and the carbon monoxide contained in the fuel gas is generated.

A third aspect of the present invention is the hydrogen generator according to the second aspect of the present invention, wherein the purge gas supplying device is a raw material supplying device configured to supply the raw material to the reformer and uses the raw material as the purge gas. In accordance with this configuration, the reformer can be purged with the raw material which is easily usable as the purge gas in the hydrogen generator.

It is effective to purge the reformer with the raw material when the reforming catalyst temperature is equal to or lower than a second predetermined temperature which is lower than a temperature at which carbon contained in the raw material is deposited on the reforming catalyst containing the nickel. This is because the deterioration of the reforming catalyst due to the deposition of the carbon contained in the raw material on the reforming catalyst can be suppressed.

Moreover, it is effective to cool down the reforming catalyst by using a cooling unit when the temperature detected by the temperature detector is higher than the second predetermined temperature. This is because a time until the purge can be shortened.

A fourth aspect of the present invention is the hydrogen generator according to any one of the first to third aspects of the present invention and further includes a heating unit configured to heat the reforming catalyst and a purge execution determining unit configured to determine whether or not the purge has been executed, wherein when the purge execution determining unit determines that the purge has not been executed and the temperature detector detects a temperature lower than the first predetermined temperature, the controller heats the reforming catalyst by the heating unit until the temperature detector detects a temperature equal to or higher than the first predetermined temperature, and the controller then causes the purge gas supplying device to purge the reformer. In accordance with this configuration, in addition to the effect of any one of the first to third aspects of the present invention, when the reforming catalyst temperature detected by the temperature detector is decreased up to a reaction temperature at which a compound of the nickel in the reforming catalyst and the carbon monoxide in the fuel gas remaining in the reformer is practically generated in a state where the purge is not executed, the reforming catalyst is heated by the heating unit. Thus, the compound is practically decomposed, and the performance deterioration of the reforming catalyst can be suppressed. Moreover, by purging the reformer with the purge gas, the fuel gas (containing the carbon monoxide) can be discharged to the outside of the hydrogen generator.

When the purge is not executed after the previous stop of the fuel gas generation in the reformer, the purge execution determining unit determines that the purge has not been executed. When such determination is made, an inner state of the reformer is a state where the fuel gas exists, to be specific, a state where the compound of the nickel in the reforming catalyst and the carbon monoxide in the fuel gas remaining in the reformer is practically generated depending on the temperature range in the reformer. On this account, to suppress the performance deterioration of the reforming catalyst, it is effective to determine by the purge execution determining unit whether or not the purge has been executed.

A fifth aspect of the present invention is the hydrogen generator according to the fourth aspect of the present invention and further includes a start-up determining unit configured to determine whether to start up the reformer to start generating the fuel gas, wherein the controller heats the reforming catalyst by the heating unit when the purge execution determining unit determines that the purge has not been executed, the start-up determining unit determines to start up the reformer, and the temperature detector detects a temperature lower than the first predetermined temperature. In accordance with this configuration, in addition to the effect of the fourth aspect of the present invention, by heating the reforming catalyst by the heating unit, heating of the reforming catalyst for the start-up and heating of the reforming catalyst for the purge can be executed at the same time.

Hereinafter, embodiments of the present invention will be explained in reference to the drawings. In the drawings, only the components necessary to explain the present invention are shown, and the other components are omitted. Further, the present invention is not limited to the following embodiments.

Embodiment 1

FIG. 1 is a block diagram showing the configuration of the hydrogen generator in Embodiment 1 of the present invention.

In FIG. 1, a hydrogen generator according to Embodiment 1 includes: a reformer 1 configured to carry out steam reforming of a hydrocarbon-based raw material gas (raw material), such as a city gas (gas containing a methane gas as a major component) or a LP gas (gas containing butane and propane as major components), by using a reforming catalyst containing nickel; a raw material gas supplying passage 2 through which a raw material gas is supplied from a raw material gas supply source to the reformer 1; a raw material gas on-off valve 3 configured to supply and stop supplying the raw material gas to the reformer 1; a steam supplying passage 4 through which steam is supplied from a steam supply source to the reformer 1; a steam on-off valve 5 configured to supply and stop supplying the steam to the reformer 1; a purge gas supplying passage 6 through which a purge gas is supplied from a purge gas supply source to the raw material gas supplying passage 2 located downstream of the raw material gas on-off valve 3; a purge gas on-off valve 7 configured to supply and stop supplying the purge gas to the reformer 1; a fuel gas discharging passage 8 through which a hydrogen-rich fuel gas generated by the steam reforming in the reformer 1 is discharged; a burner 9 configured to heat the catalyst in the reformer 1; a combustion gas supplying passage 10 through which a combustion gas is supplied from a combustion gas supply source to the burner 9; a combustion gas on-off valve 11 configured to supply and stop supplying the combustion gas to the burner 9; a temperature sensor (temperature detector) 12 configured to detect a temperature of the reforming catalyst; and a controller 13 configured to control a series of operations of the hydrogen generator. Moreover, the controller 13 includes a purge execution determining unit 14 and a start-up determining unit 15. The purge execution determining unit 14 determines whether or not a purge process performed by open and close operations of the purge gas on-off valve 7 has been executed. The start-up determining unit 15 determines whether to start up the reformer 1 to start the fuel gas generation. The controller 13 may be any device as long as it can control respective devices constituting the hydrogen generator. The controller 13 is constituted by a computer, such as a microcomputer, and includes a CPU, an internal memory constituted by a semiconductor memory, a communication portion, and a clock portion including a calendar function (which are not shown). The purge execution determining unit 14 and the start-up determining unit 15 are realized by predetermined software stored in the internal memory. Here, in the present invention, the controller 13 may be constituted by a single controller or may be constituted by a plurality of controllers which cooperate to execute control operations of a hydrogen generator 50.

The purge gas on-off valve 7, the temperature sensor 12, and the controller 13 as the components of the present embodiment are respective specific examples of the purge gas supplying device, the temperature detector, and the controller according to the first aspect of the present invention. Moreover, the burner 9 and the combustion gas on-off valve 11 as the components of the present embodiment are respective specific examples of a combustor as the heating unit according to the fourth aspect of the present invention and a combustion gas supplying device configured to supply the combustion gas to the combustor.

First, specific operations for the fuel gas generation of the hydrogen generator in Embodiment 1 will be explained. The controller 13 controls respective devices of the hydrogen generator to execute the following operations.

In the hydrogen generator shown in FIG. 1, by opening the raw material gas on-off valve 3, the city gas or the LP gas, from which an odorant component is removed, is supplied as the raw material gas (raw material) from the raw material supply source through the raw material gas supplying passage 2 to the reformer 1. Moreover, by opening the steam on-off valve 5, the steam necessary for the reforming reaction in the reformer 1 is supplied from the steam supply source through the steam supplying passage 4 to the reformer 1. In the reformer 1, after the supplied raw material gas and steam are mixed, the steam reforming is carried out by using the reforming catalyst containing the nickel to generate the hydrogen-rich fuel gas. The generated hydrogen-rich fuel gas is discharged through the fuel gas discharging passage 8 to the outside of the hydrogen generator. The discharged fuel gas may be supplied to devices, such as a fuel cell configured to generate electric power by using hydrogen. Moreover, by opening the combustion gas on-off valve 11, the combustion gas is supplied from the combustion gas supply source through the combustion gas supplying passage 10 to the burner 9 and combusted in the burner 9, and obtained combustion heat is supplied to the reformer 1 as the heat necessary for the fuel gas generation in the reformer 1 and used to increase and maintain the temperature of the reformer 1.

Next, specific operations according to the first aspect of the present invention regarding the hydrogen generator of the present embodiment will be explained. The controller 13 controls respective devices of the hydrogen generator to execute the following operations.

In hydrogen generator shown in FIG. 1, when the fuel gas generation in the reformer 1 stops, the raw material gas on-off valve 3 and the steam on-off valve 5 are closed to stop supplying the raw material gas and the steam. The temperature of the reforming catalyst decreases by, for example, heat release. When the reforming catalyst temperature detected by the temperature sensor 12 is the first predetermined temperature or higher, the purge gas on-off valve 7 opens to supply the purge gas from the purge gas supply source through the purge gas supplying passage 6 and the raw material gas supplying passage 2 to the reformer 1. Thus, the fuel gas remaining in the reformer 1 is discharged to the outside of the hydrogen generator. After the process of discharging the fuel gas by the purge is completed, the purge gas on-off valve 7 is closed to terminate the purge.

In accordance with the configuration of the hydrogen generator in the present embodiment, the purge can be executed when the reforming catalyst temperature detected by the temperature sensor 12 is the first predetermined temperature or higher. Therefore, when the reforming catalyst temperature is in a temperature range (to be specific, the first predetermined temperature or higher) in which the performance of the reforming catalyst containing the nickel does not deteriorate, the fuel gas remaining in the reformer 1 can be discharged to the outside of the hydrogen generator.

Generally, the fuel gas containing about 10% carbon monoxide remains in the reformer 1 which has stopped the fuel gas generation. Therefore, as the temperature in the reformer 1 decreases, the generation speed of generating the compound of the nickel and the carbon monoxide contained in the fuel gas becomes higher than the decomposition speed of decomposing the compound, and thus, the compound is practically generated. However, in the hydrogen generator of the present embodiment, the "first predetermined temperature" is defined as a "temperature at which the decomposition speed of decomposing the compound generated by the reaction between the nickel and the carbon monoxide becomes higher than the generation speed of generating the compound of the nickel and the carbon monoxide contained in the fuel gas. With this, the purge gas on-off valve 7 opens before the reforming catalyst temperature detected by the temperature sensor 12 decreases up to a temperature at which the compound of the nickel in the reforming catalyst and the carbon monoxide in the fuel gas remaining in the reformer 1 is practically generated. Thus, the purge gas is supplied from the purge gas supply source through the purge gas supplying passage 6 and the raw material gas supplying passage 2 to the reformer 1 to purge the reformer 1, and the carbon monoxide contained in the fuel gas can be discharged from the hydrogen generator. Therefore, the generation of the compound of the nickel and the carbon monoxide can be suppressed, and the reduction in amount of the nickel in the reforming catalyst by the discharge of the nickel to the outside of the hydrogen generator can be suppressed. Thus, the performance deterioration of the reforming catalyst can be suppressed.

In a condition in which 1% or higher (for example, 10%) carbon monoxide and nickel exist at the same time, if the reforming catalyst temperature falls below 150° C., the generation speed of generating the compound of the nickel and the carbon monoxide becomes higher than the decomposition speed of decomposing the compound, and practical compound generation starts and proceeds depending on the temperature decrease. Therefore, setting the first predetermined temperature as 150° C. and starting the purge at a temperature (for example, 180° C.) higher than the first predetermined temperature) are effective to suppress the generation of the compound of the nickel and the carbon monoxide.

Further, specific operations according to the fourth aspect of the present invention regarding the hydrogen generator in the present embodiment will be explained. The controller 13 controls respective devices of the hydrogen generator to execute the following operations.

In the hydrogen generator shown in FIG. 1, the purge execution determining unit 14 included in the controller 13 determines whether or not the purge process has been executed. When the temperature detected by the temperature sensor 12 is a temperature (for example, 120° C.) lower than the first predetermined temperature in a state where it is determined that the purge process has not been executed after the stop of the fuel gas generation in the reformer 1, the combustion gas on-off valve 11 opens. With this, the combustion gas is supplied from the combustion gas supply source through the combustion gas supplying passage 10 to the burner 9 and is combusted in the burner 9 to increase the temperature of the catalyst in the reformer 1. When the temperature detected by the temperature sensor 12 becomes a temperature (for example, 170° C.) equal to or higher than the first predetermined temperature by the above temperature increase, the purge gas on-off valve 7 opens. With this, the purge gas is supplied from the purge gas supply source through the purge gas supplying passage 6 and the raw material gas supplying passage 2 to the reformer 1, and the reformer 1 is purged with the purge gas. Thus, the fuel gas containing the carbon monoxide practically decomposed from the generated compound is discharged from the hydrogen generator. After the operation of discharging the fuel gas by the purge is completed, the purge gas on-off valve 7 is closed to terminate the purge.

Generally, the fuel gas containing about 10% carbon monoxide remains in the reformer 1 which has stopped the fuel gas generation. Therefore, as the temperature in the reformer 1 decreases, the generation speed of generating the compound of the nickel and the carbon monoxide contained in the fuel gas becomes higher than the decomposition speed of decomposing the compound, and thus, the compound is practically generated. Therefore, by purging the reformer 1 with the purge gas in this state, the compound of the nickel and the carbon monoxide is discharged to the outside of the hydrogen generator. However, in accordance with the configuration of the hydrogen generator in the present embodiment, when the temperature detected by the temperature sensor 12 is decreased up to the temperature at which the compound of the nickel and the carbon monoxide is practically generated in a state where it is determined that the purge process has not been executed, the combustion gas on-off valve 11 opens. With this, the combustion gas is supplied from the combustion gas supply source through the combustion gas supplying passage 10 to the burner 9 and is combusted in the burner 9 to increase the temperature of the reformer 1 up to a temperature (for example, 170° C.) equal to or higher than the first predetermined temperature. Thus, the compound is practically decomposed into the nickel and the carbon monoxide. Then, the purge gas on-off valve 7 opens to supply the purge gas from the purge gas supply source through the purge gas supplying passage 6 and the raw material gas supplying passage 2 to the reformer 1, and the reformer 1 is purged with the purge gas. Thus, the fuel gas containing the carbon monoxide practically decomposed from the compound can be discharged from the hydrogen generator. Therefore, the reduction in amount of the nickel in the reforming catalyst by the discharge of the nickel to the outside of the hydrogen generator can be prevented by thermal decomposition of the compound of the nickel and the carbon monoxide. On this account, the performance deterioration of the reforming catalyst can be prevented.

In a condition in which 1% or higher (for example, 10%) carbon monoxide and nickel exist at the same time, if the temperature is higher, the decomposition speed of decomposing the compound of the nickel and the carbon monoxide becomes higher than the generation speed of generating the compound of the nickel and the carbon monoxide, and practical compound decomposition is completed at 150° C. or higher. Therefore, setting the first predetermined temperature as 150° C. and increasing the temperature of the reforming catalyst up to a temperature (for example, 170° C.) higher than the first predetermined temperature are effective to carry out the thermal decomposition of the practically generated compound of the nickel and the carbon monoxide.

Here, the temperatures specifically described in the present embodiment, that is, 180° C. or 170° C. as the temperature at which the purge starts and 120° C. as the temperature (temperature for increasing the temperature of the reformer 1) lower than the first predetermined temperature are just examples, and the present embodiment is not limited to these. The temperature at which the purge starts can be set arbitrarily as long as it is equal to or higher than the first predetermined temperature.

Used as the purge gas in the present embodiment may be a purge gas which does not generate the compound with the nickel at the first predetermined temperature or higher and does not discharge the nickel to the outside of the hydrogen generator. An inactive gas, such as nitrogen, may be used. A hydrocarbon gas, such as methane or propane, may be used. Further, a gas obtained by removing the odorant component from the city gas or LP gas which is a mixture gas of the hydrocarbon gas may be used.

When the purge is not executed after the previous stop of the fuel gas generation in the reformer 1, the purge execution determining unit 14 determines that the purge has not been executed. When such determination is made, the inner state of the reformer 1 is a state where the fuel gas containing the carbon monoxide exists, to be specific, a state where the compound of the nickel in the reforming catalyst and the carbon monoxide in the fuel gas remaining in the reformer 1 is practically generated depending on the temperature range in the reformer 1. On this account, to suppress the performance deterioration of the reforming catalyst, it is effective to determine by the purge execution determining unit 14 whether or not the purge has been executed. Here, "after the previous stop of the fuel gas generation in the reformer 1" denotes "after an operation stop command is input to the controller 13 during the previous (last) operation of the hydrogen generator and the controller 13 outputs control signals to respective devices of the hydrogen generator to stop the fuel gas generation in the reformer 1".

The controller 13 opens the combustion gas on-off valve 11 when the purge execution determining unit 14 determines that the purge has not been executed, the start-up determining unit 15 determines to start up the reformer 1, and the temperature sensor 12 detects a temperature lower than the first predetermined temperature. With this, the combustion gas is supplied from the combustion gas supply source through the combustion gas supplying passage 10 to the burner 9 and combusted in the burner 9. Thus, heating of the reforming catalyst for the start-up and heating of the reforming catalyst for the purge can be carried out at the same time, and the amount of combustion gas used can be reduced, which is effective.

Further, in accordance with the hydrogen generator of Embodiment 1, the fuel gas containing the carbon monoxide generated in the reforming catalyst of the reformer 1 is supplied to devices, such as the fuel cell. However, the present embodiment is not limited to this. The fuel gas having passed through a shift converter or a carbon monoxide remover may be supplied to the devices, such as the fuel cell. In the hydrogen generator, the shift converter has a shift catalyst (for example, a copper-zinc based catalyst) for reducing the carbon monoxide in the fuel gas supplied from the reformer 1, and the carbon monoxide remover has an oxidation catalyst (for example, a ruthenium based catalyst) or a methanation catalyst (for example, a ruthenium based catalyst).

Embodiment 2

Figure 2:
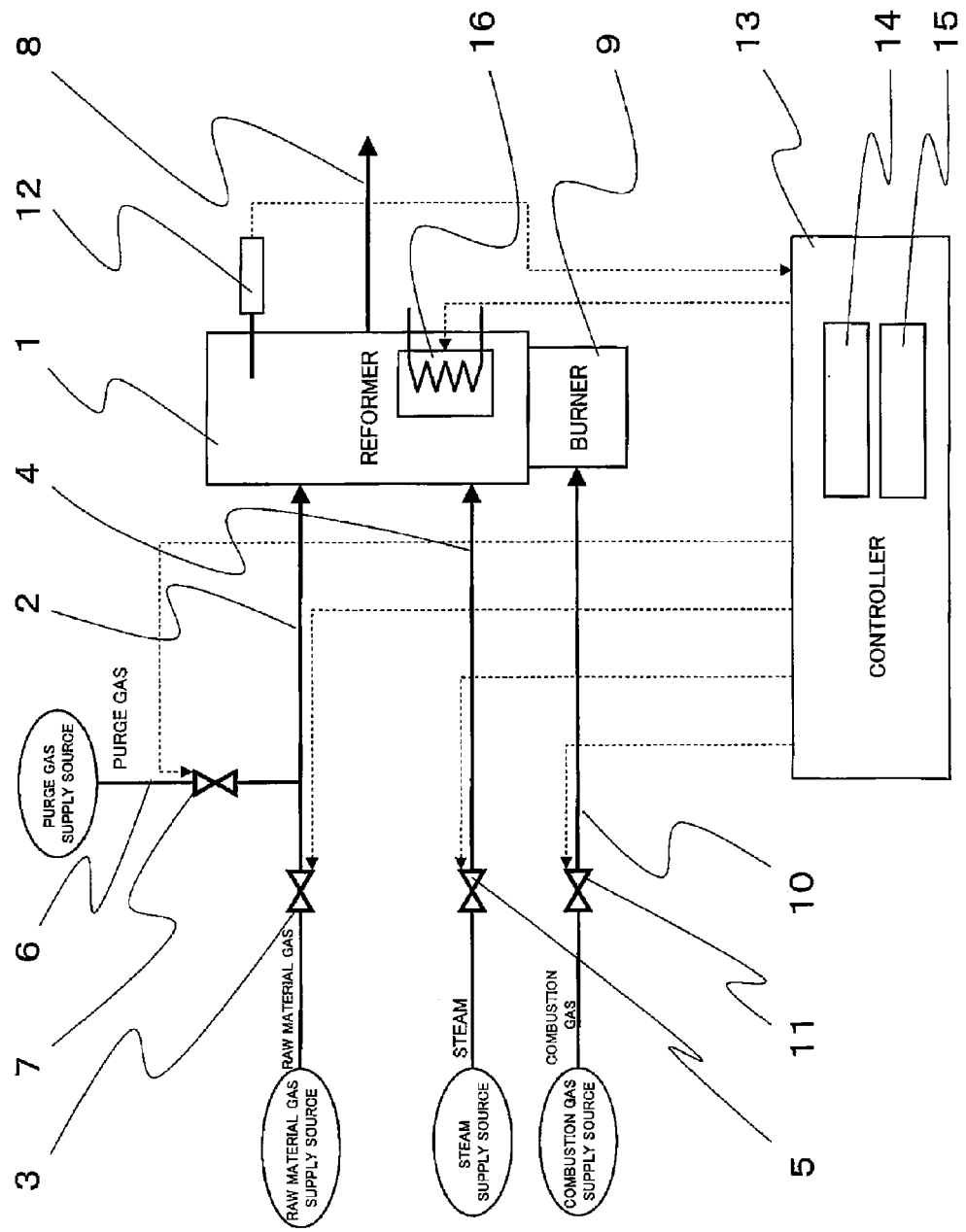
FIG. 2 is a block diagram showing the configuration of the hydrogen generator in Embodiment 2 of the present invention.

FIG. 2 is a block diagram showing the configuration of the hydrogen generator in Embodiment 2 of the present invention. In FIG. 2, the same reference signs are used for the same components as in FIG. 1, and explanations thereof are omitted.

The hydrogen generator of the present embodiment is the hydrogen generator shown in FIG. 1 and further includes a thermal heater 16 configured to heat the catalyst in the reformer 1.

The thermal heater 16 as a component of the present embodiment is a specific example of a heater as the heating unit according to the fourth aspect of the present invention.

Next, specific operations according to the fourth aspect of the present invention regarding the hydrogen generator in the present embodiment will be explained.

In the hydrogen generator shown in FIG. 2, the purge execution determining unit 14 included in the controller 13 determines whether or not the purge process has been executed. When the temperature detected by the temperature sensor 12 is a temperature (for example, 120° C.) lower than the first predetermined temperature in a state where it is determined that the purge process has not been executed after the stop of the fuel gas generation in the reformer 1, electricity is supplied to the thermal heater 16 to increase the temperature of the reformer 1 by the heating of the heater. When the temperature detected by the temperature sensor 12 becomes a temperature (for example, 170° C.) equal to or higher than the first predetermined temperature by the above temperature increase, the supply of the electricity to the thermal heater 16 stops, and the purge gas on-off valve 7 opens. With this, the purge gas is supplied from the purge gas supply source through the purge gas supplying passage 6 and the raw material gas supplying passage 2 to the reformer 1, and the reformer 1 is purged with the purge gas. Thus, the fuel gas containing the carbon monoxide practically decomposed from the generated compound is discharged from the hydrogen generator. After the process of discharging the fuel gas by the purge is completed, the purge gas on-off valve 7 is closed to terminate the purge.

Generally, the fuel gas containing about 10% carbon monoxide remains in the reformer 1 which has stopped the fuel gas generation. Therefore, as the temperature in the reformer 1 decreases, the generation speed of generating the compound of the nickel and the carbon monoxide contained in the fuel gas becomes higher than the decomposition speed of decomposing the compound, and the compound is practically generated. Therefore, by purging the reformer 1 with the purge gas in this state, the compound of the nickel and the carbon monoxide is discharged to the outside of the hydrogen generator. However, in accordance with the configuration of the hydrogen generator in the present embodiment, when the temperature detected by the temperature sensor 12 is decreased up to the temperature at which the compound of the nickel and the carbon monoxide is practically generated in a state where it is determined that the purge process has not been carried out, electricity is supplied to the thermal heater 16 to increase the temperature of the reformer 1 up to a temperature (for example, 170° C.) equal to or higher than the first predetermined temperature. With this, the compound is practically decomposed into the nickel and the carbon monoxide. Then, the purge gas on-off valve 7 opens to supply the purge gas from the purge gas supply source through the purge gas supplying passage 6 and the raw material gas supplying passage 2 to the reformer 1, and the reformer 1 is purged with the purge gas. Thus, the fuel gas containing the carbon monoxide practically decomposed from the compound can be discharged from the hydrogen generator. Therefore, the reduction in amount of the nickel in the reforming catalyst by the discharge of the nickel to the outside of the hydrogen generator can be suppressed by the thermal decomposition of the compound of the nickel and the carbon monoxide. On this account, the performance deterioration of the reforming catalyst can be suppressed.

The supply of electricity to the thermal heater 16 stops "when starting the purge". However, the present embodiment is not limited to this, and the supply of electricity may be continued until the completion of the purge. Moreover, the supply of electricity may be executed and stopped repeatedly such that the temperature becomes equal to or higher than the first predetermined temperature. Further, the amount of electricity supplied may be controlled such that the temperature becomes equal to or higher than the first predetermined temperature.

The temperatures specifically described in the present embodiment, that is, 170° C. as the temperature at which the purge starts and 120° C. as the temperature (temperature for increasing the temperature of the reformer 1) lower than the first predetermined temperature are just examples, and the present embodiment is not limited to these. The temperature at which the purge starts can be set arbitrarily as long as it is equal to or higher than the first predetermined temperature.

Used as the purge gas in the present embodiment may be a purge gas which does not generate the compound with the nickel at the first predetermined temperature or higher and does not discharge the nickel to the outside of the hydrogen generator. An inactive gas, such as nitrogen, may be used. A hydrocarbon gas, such as methane or propane, may be used. Further, a gas obtained by removing the odorant component from the city gas or LP gas which is a mixture gas of the hydrocarbon gas may be used.

When the purge is not executed after the previous stop of the fuel gas generation in the reformer 1, the purge execution determining unit 14 determines that the purge has not been executed. When such determination is made, the inner state of the reformer 1 is a state where the fuel gas containing the carbon monoxide exists, to be specific, a state where the compound of the nickel in the reforming catalyst and the carbon monoxide in the fuel gas remaining in the reformer 1 is practically generated depending on the temperature range in the reformer 1. On this account, to suppress the performance deterioration of the reforming catalyst, it is effective to determine by the purge execution determining unit 14 whether or not the purge has been executed.

The controller 13 supplies electricity to the thermal heater 16 to heat the reforming catalyst when the purge execution determining unit 14 determines that the purge has not been executed, the start-up determining unit 15 determines to start up the reformer 1, and the temperature sensor 12 detects a temperature lower than the first predetermined temperature. With this, heating of the reforming catalyst for the start-up and heating of the reforming catalyst for the purge can be carried out at the same time, and the amount of combustion gas used in the burner 9 to heat the reforming catalyst can be reduced, which is effective.

Embodiment 3

Figure 3:
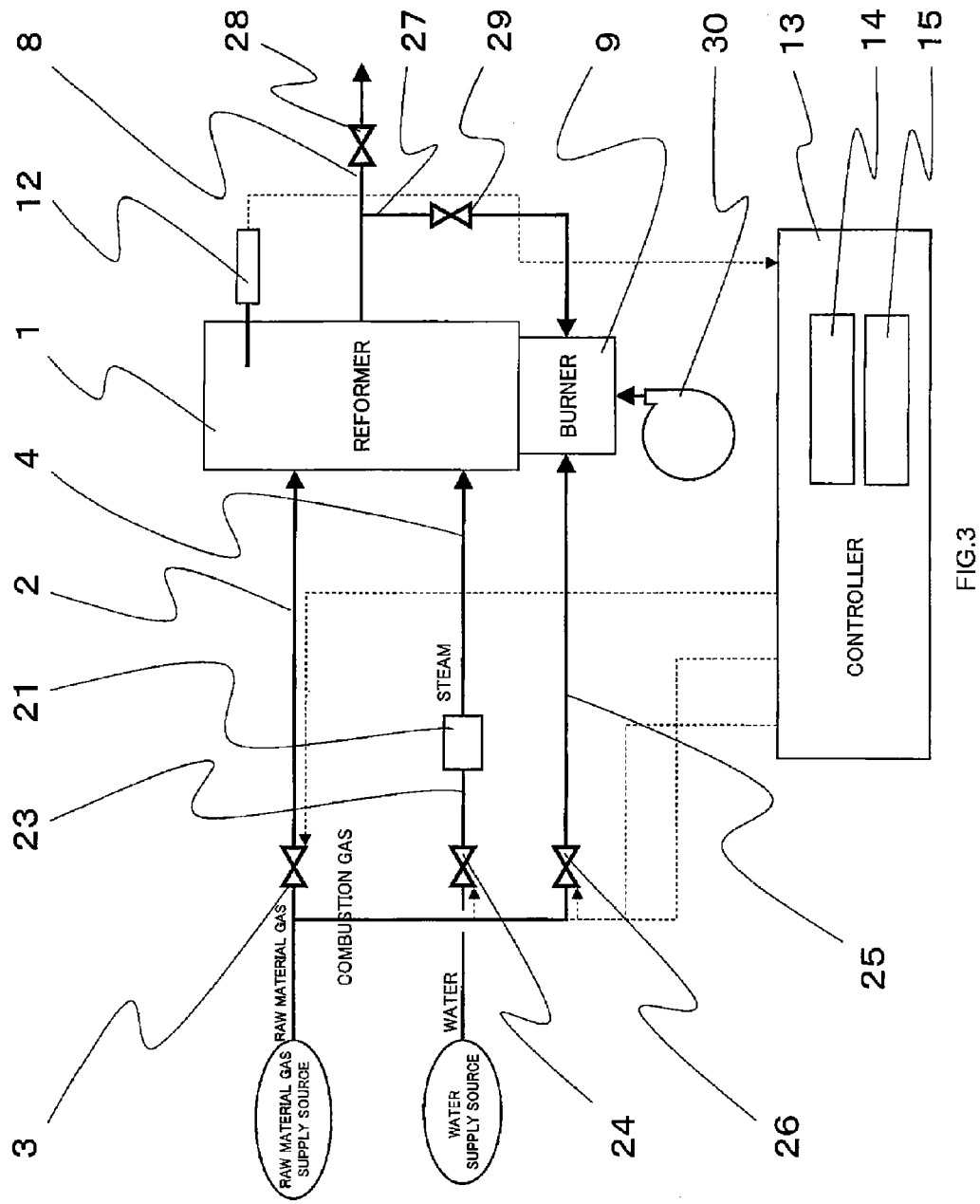
FIG. 3 is a block diagram showing the configuration of the hydrogen generator in Embodiment 3 of the present invention.
Figure 4:
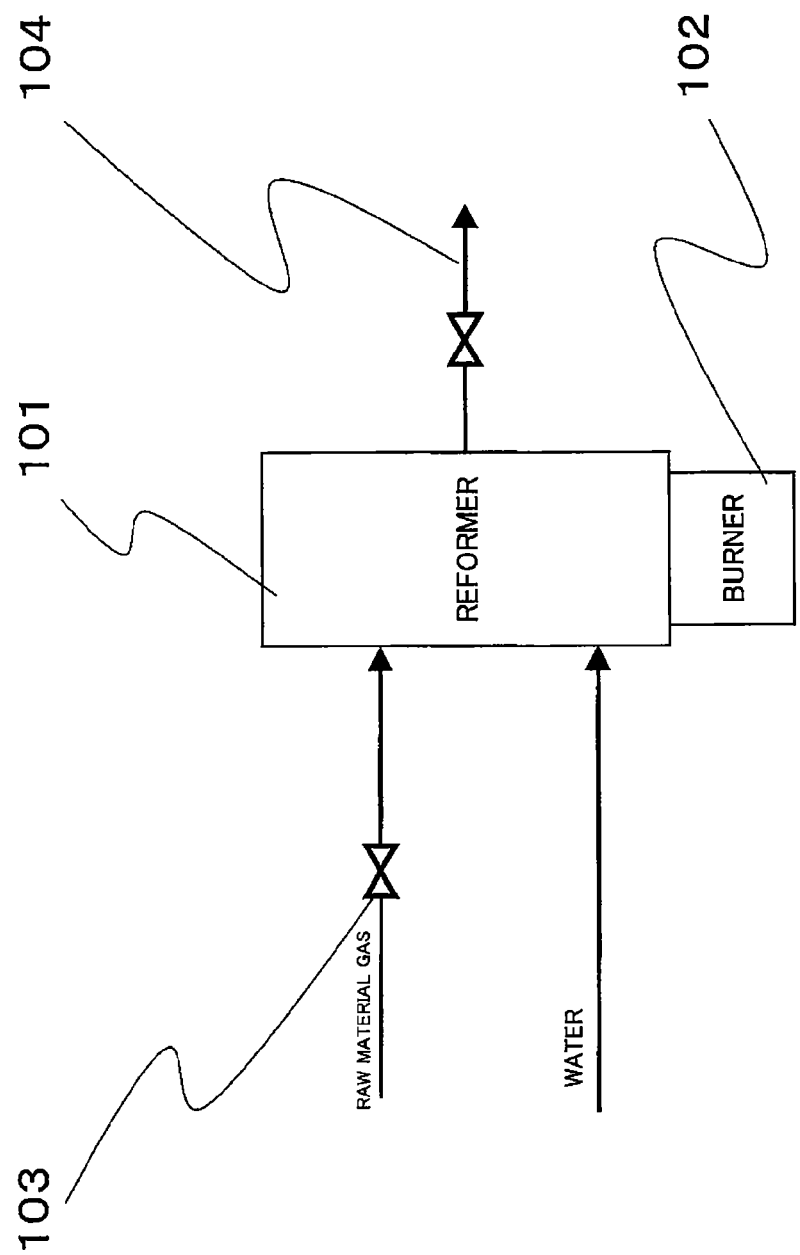
FIG. 4 is a schematic diagram showing a conventional hydrogen generator described in PTL 1.

FIG. 3 is a block diagram showing the configuration of the hydrogen generator in Embodiment 2 of the present invention. In FIG. 3, the same reference signs are used for the same components as in FIG. 1, and explanations thereof are omitted.

In FIG. 3, the hydrogen generator in the present embodiment includes: the reformer 1; the raw material gas supplying passage 2; the raw material gas on-off valve 3; the fuel gas discharging passage 8; the burner 9; the temperature sensor 12; the purge execution determining unit 14; a water evaporator 21 configured to generate the steam supplied to the reformer 1; the steam supplying passage 4 through which the steam generated in the water evaporator 21 is supplied to the reformer 1; a water supplying passage 23 through which water is supplied from a water supply source to the water evaporator 21; a water on-off valve 24 configured to supply and stop supplying the water to the water evaporator 21; a combustion gas supplying passage 25 which branches from the raw material gas supplying passage 2 located upstream of the raw material gas on-off valve 3 and through which the raw material gas is supplied as the combustion gas to the burner 9; a combustion gas on-off valve 26 configured to supply and stop supplying the combustion gas to the burner 9; a fuel gas return passage 27 which branches from the fuel gas discharging passage 8 and through which the raw material gas or fuel gas discharged from the reformer 1 is supplied to the burner 9; a fuel gas on-off valve 28 configured to discharge and stop discharging the fuel gas to the fuel gas discharging passage 8 which branches from the fuel gas return passage 27; a return gas on-off valve 29 configured to supply and stop supplying the fuel gas to the burner 9; a combustion fan 30 configured to supply cooling air for cooling down the reformer 1 when supplying and stopping supplying the combustion air to the burner 9; and the controller 13 configured to control a series of operations of the hydrogen generator.

The raw material gas on-off valve 3 as a component in the present embodiment is one specific example of the raw material supplying device in the third aspect of the present invention.

First, specific operations regarding the fuel gas generation of the hydrogen generator in the present embodiment will be explained.

In the hydrogen generator shown in FIG. 3, by opening the raw material gas on-off valve 3, the city gas or LP gas, from which the odorant component is removed, is supplied as the raw material gas from the raw material supply source through the raw material gas supplying passage 2 to the reformer 1. Moreover, by opening the water on-off valve 24, the water is supplied from the water supply source through the water supplying passage 23 to the water evaporator 21, and the steam necessary for the reforming reaction in the reformer 1 is generated in the water evaporator 21. The steam generated in the water evaporator 21 is supplied through the steam supplying passage 4 to the reformer 1. In the reformer 1, after the supplied raw material gas and steam are mixed, the steam reforming is carried out by using the reforming catalyst containing the nickel to generate the hydrogen-rich fuel gas. By opening the fuel gas on-off valve 28, the generated hydrogen-rich fuel gas is discharged through the fuel gas discharging passage 8 to the outside of the hydrogen generator. The discharged fuel gas can be supplied to devices, such as the fuel cell configured to generate electric power by using hydrogen. Moreover, by opening the combustion gas on-off valve 26, the combustion gas is supplied from the raw material gas supply source through the raw material gas supplying passage 2 and the combustion gas supplying passage 25 to the burner 9 and is combusted in the burner 9 together with the air supplied by the combustion fan 30, and obtained combustion heat is supplied to the reformer 1 as the heat necessary for the fuel gas generation in the reformer 1 and used to increase and maintain the temperature of the reformer 1.

Next, specific operations according the third aspect of the present invention regarding the hydrogen generator in the present embodiment will be explained.

In the hydrogen generator shown in FIG. 3, when the fuel gas generation in the reformer 1 stops, the raw material gas on-off valve 3 and the water on-off valve 24 are closed to stop supplying the raw material gas and the steam. The temperature of the reforming catalyst decreases by, for example, heat release. When the reforming catalyst temperature detected by the temperature sensor 12 is the first predetermined temperature or higher, the raw material gas on-off valve 3 and the fuel gas on-off valve 28 open to supply the raw material gas as the purge gas from the raw material gas supply source through the raw material gas supplying passage 2 to the reformer 1. Thus, the fuel gas remaining in the reformer 1 is discharged to the outside of the hydrogen generator. After the process of discharging the fuel gas by the raw material gas purge is completed, the raw material gas on-off valve 3 and the fuel gas on-off valve 28 are closed to terminate the raw material gas purge.

In accordance with the configuration of the hydrogen generator of the present embodiment, the purge can be carried out by using the raw material gas when the reforming catalyst temperature detected by the temperature sensor 12 is a temperature equal to or higher than the first predetermined temperature related to the reforming catalyst and the fuel gas remaining in the reformer 1. Therefore, when the reforming catalyst temperature detected by the temperature sensor 12 is in the temperature range in which the performance of the reforming catalyst containing the nickel does not deteriorate, the fuel gas remaining in the reformer 1 can be discharged to the outside of the hydrogen generator.

Generally, the fuel gas containing about 10% carbon monoxide remains in the reformer 1 which has stopped the fuel gas generation. Therefore, as the temperature in the reformer 1 decreases, the generation speed of generating the compound of the nickel and the carbon monoxide contained in the fuel gas becomes higher than the decomposition speed of decomposing the compound, and the compound is practically generated. Moreover, if the hydrocarbon-based raw material, such as the city gas or the LP gas, flows through the reforming catalyst containing the nickel, carbon in the raw material gas is deposited around the nickel on the catalyst with increasing temperature, and this deteriorates the performance of the catalyst. However, in the hydrogen generator in the present embodiment, the "first predetermined temperature" is defined as a "temperature at which the decomposition speed of decomposing the compound generated by the reaction between the nickel and the carbon monoxide becomes higher than the generation speed of generating the compound of the nickel and the carbon monoxide contained in the fuel gas. With this, by opening the raw material gas on-off valve 3 before the reforming catalyst temperature detected by the temperature sensor 12 decreases up to the temperature at which the compound of the nickel in the reforming catalyst and the carbon monoxide in the fuel gas remaining in the reformer 1 is practically generated, the raw material gas is supplied as the purge gas from the raw material gas supply source through the raw material gas supplying passage 2 to the reformer 1, and the purge is executed in the temperature range in which carbon contained in the raw material gas as the purge gas is not deposited on the reforming catalyst. Thus, the carbon monoxide contained in the fuel gas can be discharged from the hydrogen generator. Therefore, the generation of the compound of the nickel and the carbon monoxide can be suppressed, and the reduction in amount of the nickel in the reforming catalyst by the discharging of the nickel to the outside of the hydrogen generator can be suppressed. On this account, the performance deterioration of the reforming catalyst can be suppressed. Further, since the purge gas supply source, the purge gas supplying passage 6, and the purge gas on-off valve 7, which constitute Embodiment 1, can be omitted, the cost reduction can be realized.

In a condition in which 1% or higher (for example, 10%) carbon monoxide and nickel exist at the same time, if the temperature falls below 150° C., the generation speed of generating the compound of the nickel and the carbon monoxide becomes higher than the decomposition speed of decomposing the compound, and practical compound generation starts and proceeds depending on the temperature decrease. Therefore, setting the first predetermined temperature as 150° C. and staring the purge at a temperature (for example, 180° C.) higher than the first predetermined temperature are effective to suppress the generation of the compound of the nickel and the carbon monoxide.

When carrying out the raw material gas purge, the fuel gas on-off valve 28 opens to discharge the raw material gas through the fuel gas discharging passage 8 to the outside. However, the fuel gas on-off valve 28 may be closed and the return gas on-off valve 29 may open to discharge the raw material gas through the burner 9 to the outside. Moreover, the raw material gas may be combusted in the burner 9.

Moreover, if the hydrocarbon-based raw material, such as the city gas or the LP gas, flows through the reforming catalyst containing the nickel, carbon in the raw material gas is deposited around the nickel on the catalyst with increasing temperature, and this deteriorates the performance of the catalyst. However, in the hydrogen generator in the present embodiment, the "second predetermined temperature" is defined as a "temperature lower than the temperature at which the raw material gas as the purge gas deteriorates the reforming catalyst". With this, by opening the raw material gas on-off valve 3 when the reforming catalyst temperature detected by the temperature sensor 12 is lower than the temperature at which the reaction between the raw material gas as the purge gas and the nickel in the reforming catalyst causes the deterioration of the catalyst, the raw material gas is supplied as the purge gas from the raw material gas supply source through the raw material gas supplying passage 2 to the reformer 1, and the purge is executed in the temperature range in which carbon contained in the raw material gas as the purge gas is not deposited on the reforming catalyst. Thus, the carbon monoxide contained in the fuel gas can be discharged from the hydrogen generator. Therefore, the deposition of carbon of the raw material gas as the purge gas around the nickel in the reforming catalyst can be suppressed. On this account, the performance deterioration of the reforming catalyst can be suppressed. Further, since the purge gas supply source, the purge gas supplying passage 6, and the purge gas on-off valve 7, which constitute Embodiment 1, can be omitted, the cost reduction can be realized.

In a condition in which only the hydrocarbon-based raw material flows through the reforming catalyst containing the nickel, the deposition of carbon around the nickel starts at higher than 300° C., and the amount of deposition increases with increasing temperature. Therefore, setting the second predetermined temperature as 300° C. and starting the purge at a temperature (for example, 180° C.) lower than the second predetermined temperature are effective to suppress the deposition of carbon around the nickel.

When the reforming catalyst temperature detected by the temperature sensor 12 is higher than the second predetermined temperature, the combustion fan 30 as a cooling unit for cooling the reforming catalyst is activated to supply air as a cooling medium to the burner 9, thereby cooling down the reforming catalyst of the reformer 1 via the burner 9. With this, the reforming catalyst temperature can be decreased up to a temperature lower than the temperature at which the deterioration of the catalyst occurs by the reaction between the raw material gas as the purge gas and the nickel in the reforming catalyst, and a time until the raw material gas purge can be shortened, which are effective. Moreover, to efficiently cool down the reforming catalyst of the reformer 1 by the combustion fan 30, it is preferable that the controller 13 control the combustion fan 30 such that an operation amount of the combustion fan 30 becomes large, and it is more preferable that the controller 13 control the combustion fan 30 such that the operation amount of the combustion fan 30 becomes the largest.

Further, specific operations according to the fourth aspect of the present invention regarding the hydrogen generator in the present embodiment will be explained.

In the hydrogen generator shown in FIG. 3, the purge execution determining unit 14 determines whether or not the purge process has been executed. The controller 13 opens the combustion gas on-off valve 26 when the temperature detected by the temperature sensor 12 is a temperature (for example, 120° C.) lower than the first predetermined temperature in a state where the purge execution determining unit 14 determines that the purge process has not been executed after the stop of the fuel gas generation of the reformer 1. With this, the combustion gas is supplied from the raw material gas supply source through the raw material gas supplying passage 2 and the combustion gas supplying passage 25 to the burner 9 and combusted in the burner 9 to increase the temperature of the catalyst in the reformer 1. When the temperature detected by the temperature sensor 12 becomes a temperature (for example, 170° C.) not lower than the first predetermined temperature and not higher than the second predetermined temperature by the above temperature increase, the raw material gas on-off valve 3 and the fuel gas on-off valve 28 open to supply the raw material gas as the purge gas from the raw material gas supply source through the raw material gas supplying passage 2 to the reformer 1, and the reformer 1 is purged with the raw material gas. Thus, the fuel gas containing the carbon monoxide practically decomposed from the generated compound is discharged from the hydrogen generator. After the process of discharging the fuel gas by the raw material gas purge is completed, the raw material gas on-off valve 3 and the fuel gas on-off valve 28 are closed to terminate the raw material gas purge.

Generally, the fuel gas containing about 10% carbon monoxide remains in the reformer 1 which has stopped the fuel gas generation. Therefore, as the temperature in the reformer 1 decreases, the generation speed of generating the compound of the nickel and the carbon monoxide contained in the fuel gas becomes higher than the decomposition speed of decomposing the compound, and the compound is practically generated. Therefore, if the reformer 1 is purged with the raw material gas as the purge gas in this state, the compound of the nickel and the carbon monoxide is discharged to the outside of the hydrogen generator. Moreover, if the hydrocarbon-based raw material, such as the city gas or the LP gas, flows through the reforming catalyst containing the nickel, and the temperature of the reforming catalyst increases up to a predetermined temperature or higher, carbon in the raw material gas is deposited around the nickel on the reforming catalyst, and this deteriorates the performance of the catalyst. However, in accordance with the configuration of the hydrogen generator in the present embodiment, by opening the combustion gas on-off valve 26 when the temperature detected by the temperature sensor 12 decreases up to a temperature equal to or lower than the temperature at which the compound of the nickel and the carbon monoxide is practically generated in a state where it is determined that the purge process has not been executed, the combustion gas is supplied from the raw material gas supply source through the combustion gas supplying passage 25 to the burner 9 and combusted in the burner 9. Thus, the temperature of the reformer 1 is increased up to a temperature (for example, 170° C.) not lower than the first predetermined temperature and not higher than the second predetermined temperature. With this, the compound is practically decomposed into the nickel and the carbon monoxide. Then, when the temperature is lower than the temperature at which the deterioration of the catalyst occurs by the reaction between the raw material gas as the purge gas and the nickel in the reforming catalyst, the raw material gas on-off valve 3 and the fuel gas on-off valve 28 open to supply the purge gas as the raw material gas from the raw material gas supply source through the raw material gas supplying passage 2 to the reformer 1, and the purge is executed in the temperature range in which carbon contained in the raw material gas as the purge gas is not deposited on the reforming catalyst. Thus, the carbon monoxide contained in the fuel gas can be discharged from the hydrogen generator. Therefore, the reduction in amount of the nickel in the reforming catalyst by the discharge of the nickel to the outside of the hydrogen generator can be suppressed by the thermal decomposition of the compound of the nickel and the carbon monoxide. In addition, the deterioration of the catalyst can be suppressed since the purge is executed at a temperature lower than the temperature at which the deterioration of the catalyst occurs by the reaction between the raw material gas as the purge gas and the nickel in the reforming catalyst. On this account, the performance deterioration of the reforming catalyst can be suppressed. Further, since the purge gas supply source, the purge gas supplying passage 6, and the purge gas on-off valve 7, which constitute Embodiment 1, can be omitted, the cost reduction can be realized.

In a condition in which 1% or higher (for example, 10%) carbon monoxide and nickel exist at the same time, if the temperature is higher, the decomposition speed of decomposing the compound of the nickel and the carbon monoxide becomes higher than the generation speed of generating the compound, and practical compound decomposition is completed at 150° C. or higher. Therefore, setting the first predetermined temperature as 150° C. and increasing the temperature of the reforming catalyst up to a temperature (for example, 170° C.) higher than the first predetermined temperature are effective to carry out the thermal decomposition of the practically generated compound of the nickel and the carbon monoxide. In a condition in which only the hydrocarbon-based raw material flows through the reforming catalyst containing the nickel, the deposition of carbon around the nickel starts at higher than 300° C., and the amount of deposition increases with increasing temperature. Therefore, setting the second predetermined temperature as 300° C. and starting the purge at a temperature (for example, 170° C.) lower than the second predetermined temperature are effective to suppress the deposition of carbon around the nickel.

Here, the temperatures specifically described in the present embodiment, that is, 180° C. or 170° C. as the temperature at which the purge starts and 120° C. as the temperature lower than the first predetermined temperature are just examples, and the present embodiment is not limited to these. These temperatures may be arbitrarily set as long as they are not lower than the first predetermined temperature and not higher than the second predetermined temperature or are lower than the first predetermined temperature.

When the purge is not executed after the previous stop of the fuel gas formation in the reformer 1, the purge execution determining unit 14 determines that the purge has not been executed. When such determination is made, the inner state of the reformer 1 is a state where the fuel gas containing the carbon monoxide exists, to be specific, a state where the compound of the nickel in the reforming catalyst and the carbon monoxide in the fuel gas remaining in the reformer 1 is practically generated depending on the temperature range in the reformer 1. On this account, determining by the purge execution determining unit 14 whether or not the purge has been executed is effective to suppress the performance deterioration of the reforming catalyst.

The controller 13 includes the start-up determining unit 15 configured to determine whether to start up the reformer 1 to start the fuel gas generation. The controller 13 opens the combustion gas on-off valve 11 when the purge execution determining unit 14 determines that the purge has not been executed, the start-up determining unit 15 determines to start up the reformer 1, and the temperature sensor 12 detects a temperature lower than the first predetermined temperature. With this, the combustion gas is supplied from the combustion gas supply source through the combustion gas supplying passage 10 to the burner 9 and combusted in the burner 9. Thus, heating of the reforming catalyst for the start-up and heating of the reforming catalyst for the purge are carried out at the same time. On this account, the amount of combustion gas used can be reduced, which is effective.

Embodiment 4

Configuration of Hydrogen Generator

Figure 5:
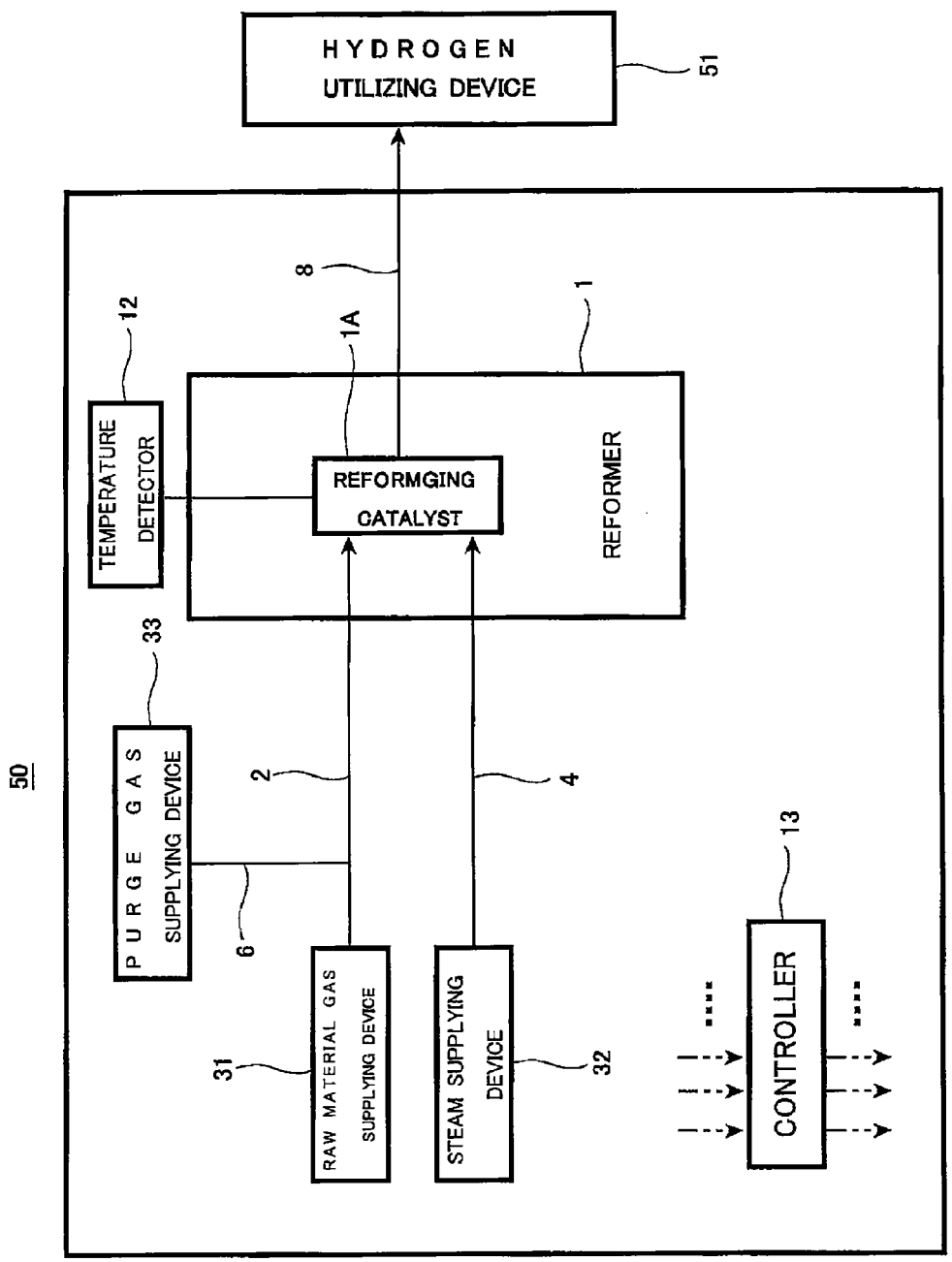
FIG. 5 is a block diagram schematically showing a schematic configuration of the hydrogen generator in Embodiment 4 of the present invention.

FIG. 5 is a block diagram schematically showing a schematic configuration of the hydrogen generator according to Embodiment 4 of the present invention.

As shown in FIG. 5, the hydrogen generator 50 according to Embodiment 4 of the present invention includes: the reformer 1 including a reforming catalyst 1A containing nickel; a temperature detector 12; a purge gas supplying device 33; and the controller 13. When the temperature of the reforming catalyst 1A of the reformer 1 detected by the temperature detector 12 is the first predetermined temperature or higher, the controller 13 controls the purge gas supplying device 33 such that the reformer 1 is purged with the purge gas.

A raw material gas supplying device (raw material supplying device) 31 is connected to the reforming catalyst 1A of the reformer 1 via the raw material gas supplying passage 2. In addition, a steam supplying device 32 is connected to the reforming catalyst 1A via the steam supplying passage 4. With this, the raw material gas (raw material) and the steam are supplied to the reforming catalyst 1A of the reformer 1.

The raw material gas supplying device 31 is configured to supply the raw material gas to the reforming catalyst 1A of the reformer 1 while adjusting the flow rate of the raw material gas. The raw material gas supplying device 31 may be any device as long as it can supply the raw material while adjusting the flow rate of the raw material and can stop supplying the raw material gas. For example, the raw material gas supplying device 31 may be constituted by a flow rate control valve or a combination of a booster pump and a flow rate control valve. Here, the raw material (gas) may be any raw material as long as the hydrogen-containing gas can be generated by the reforming reaction using the raw material and the steam. The raw material gas is, for example, a gas containing an organic compound whose constituent elements are at least carbon and hydrogen. Examples are hydrocarbons, such as ethane and propane.

The steam supplying device 32 is configured to supply the steam to the reforming catalyst 1A of the reformer 1 while adjusting the flow rate of the steam. The steam supplying device 32 may be any device as long as it can supply the steam to the reforming catalyst 1A of the reformer 1 while adjusting the flow rate of the steam and can stop supplying the steam. The steam supplying device 32 is constituted by a flow rate adjuster configured to adjust the flow rate of water, an evaporator configured to evaporate the water, and a shut-off device configured to stop the flow of the water or the steam. Moreover, the flow rate adjuster may be constituted by a flow rate control valve, a pump, or a combination of a pump and a flow rate control valve.

Moreover, the purge gas supplying device 33 is connected to a portion of the raw material gas supplying passage 2 via the purge gas supplying passage 6. With this, the purge gas is supplied from the purge gas supplying device 33 through the purge gas supplying passage 6 and the raw material gas supplying passage 2 to the reformer 1.

Here, an inactive gas, such as nitrogen, may be used as the purge gas. Moreover, hydrocarbon, such as methane or propane, or the city gas or LP gas, from which the odorant component is removed, supplied from a gas infrastructure, which are examples of the raw material gas, may be used. Moreover, the purge gas supplying device 33 may be any device as long as it can supply and stop supplying the purge gas to the purge gas supplying passage 6. For example, the purge gas supplying device 33 may be constituted by a gas tank configured to store the gas, a pump configured to supply the purge gas from the gas tank to the purge gas supplying passage 6, and an on-off valve configured to allow and stop the flow of the purge gas. Moreover, the purge gas supplying device 33 may be constituted by the gas tank and the pump.

In the reforming catalyst 1A of the reformer 1, the reforming reaction between the supplied raw material gas and steam is carried out to generate the hydrogen-rich fuel gas. The generated fuel gas is supplied through the fuel gas discharging passage 8 to a hydrogen utilizing device (such as a fuel cell or a hydrogen storage tank) 51.

Moreover, the temperature detector 12 is provided for the reforming catalyst 1A. The temperature detector 12 is configured to detect the temperature of the reforming catalyst 1A and output the obtained temperature to the controller 13. For example, a thermocouple or a thermistor may be used as the temperature detector 12. The temperature detector 12 may directly detect the temperature of the reforming catalyst 1A. Moreover, the temperature detector 12 may indirectly detect the temperature of the reforming catalyst 1A by detecting the temperature of the gas, such as the fuel gas, flowing through, for example, the reforming catalyst 1A.

The controller 13 may be any device as long as it can control respective devices constituting the hydrogen generator. The controller 13 is constituted by a computer, such as a microcomputer, and includes a CPU, an internal memory constituted by a semiconductor memory, a communication portion, and a clock portion including a calendar function (which are not shown).

Operations of Hydrogen Generator

Next, operations of the hydrogen generator 50 according to Embodiment 4 will be explained in reference to FIG. 6. Herein, a stop operation of the hydrogen generator 50 will be explained. Since operations of the fuel gas generation (hydrogen gas generation) of the hydrogen generator 50 according to Embodiment 1 are the same as the operations of the fuel gas generation (hydrogen gas generation) of the common hydrogen generator 50, explanations thereof are omitted.

Figure 6:
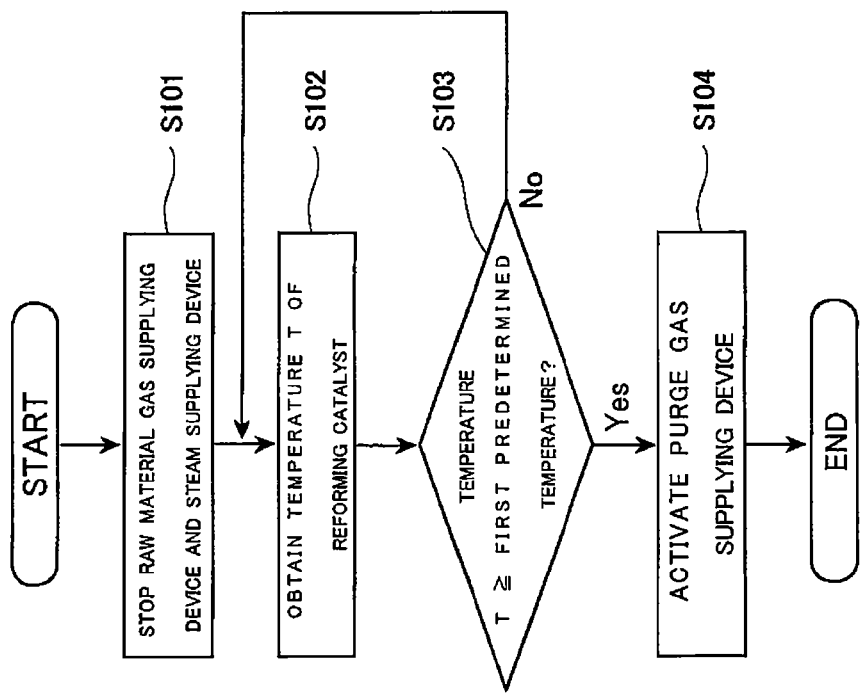
FIG. 6 is a flow chart schematically showing a stop operation (stop process) of the hydrogen generator in Embodiment 4.

FIG. 6 is a flow chart schematically showing the stop operation (stop process) of the hydrogen generator 50 according to Embodiment 4.

First, the hydrogen generator 50 carries out a hydrogen generating operation. Then, for example, when the operation stop command is input to the controller 13 by operating a remote controller, not shown, by a user or getting to a predetermined time at which the hydrogen generator 50 stops operating, the controller 13 outputs the stop command to the raw material gas supplying device 31 and the steam supplying device 32 as shown in FIG. 6 (Step S101). With this, the supply of the raw material gas and steam to the reforming catalyst 1A of the reformer 1 stops, and the supply of the fuel gas to the hydrogen utilizing device 51 stops. The fuel gas containing the carbon monoxide remains in the reformer 1, and the reformer 1 is cooled down by natural radiational cooling.

Next, the controller 13 obtains a temperature T of the reforming catalyst 1A from the temperature detector 12 (Step S102) and determines whether or not the temperature T obtained in Step S102 is the first predetermined temperature or higher (Step S103). Here, the first predetermined temperature is defined as a temperature at which the decomposition speed of decomposing the compound of the nickel and the carbon monoxide becomes higher than the generation speed of generating the compound of the nickel contained in the reforming catalyst 1A and the carbon monoxide contained in the fuel gas. For example, the first predetermined temperature may be 150° C.

When the temperature T is the first predetermined temperature or higher, the controller 13 activates the purge gas supplying device 33 (Step S104). With this, the purge gas supplying device 33 supplies the purge gas through the purge gas supplying passage 6 and the raw material gas supplying passage 2 to the reformer 1. The fuel gas in the reformer 1 is purged with the purge gas supplied from the purge gas supplying device 33.

Then, after the reformer 1 is purged with the purge gas, the controller 13 stops the purge gas supplying device 33 to terminate the present program.

As above, the hydrogen generator 50 according to Embodiment 4 is configured such that the reformer 1 is purged when the temperature of the reforming catalyst 1A is the first predetermined temperature or higher. On this account, the decomposition reaction of the compound of the nickel and the carbon monoxide is carried out, and the discharge of the compound of the nickel and the carbon monoxide to the outside of the reformer 1, that is, to the outside of the hydrogen generator 50 can be suppressed. Therefore, in the hydrogen generator 50 according to Embodiment 4, the reduction in amount of the nickel in the reforming catalyst 1A can be suppressed, and the performance deterioration of the reformer 1 can be suppressed.

Embodiment 5

In the hydrogen generator according to Embodiment 5 of the present invention, the raw material supplying device serves as the purge gas supplying device.

Configuration of Hydrogen Generator

Figure 7:
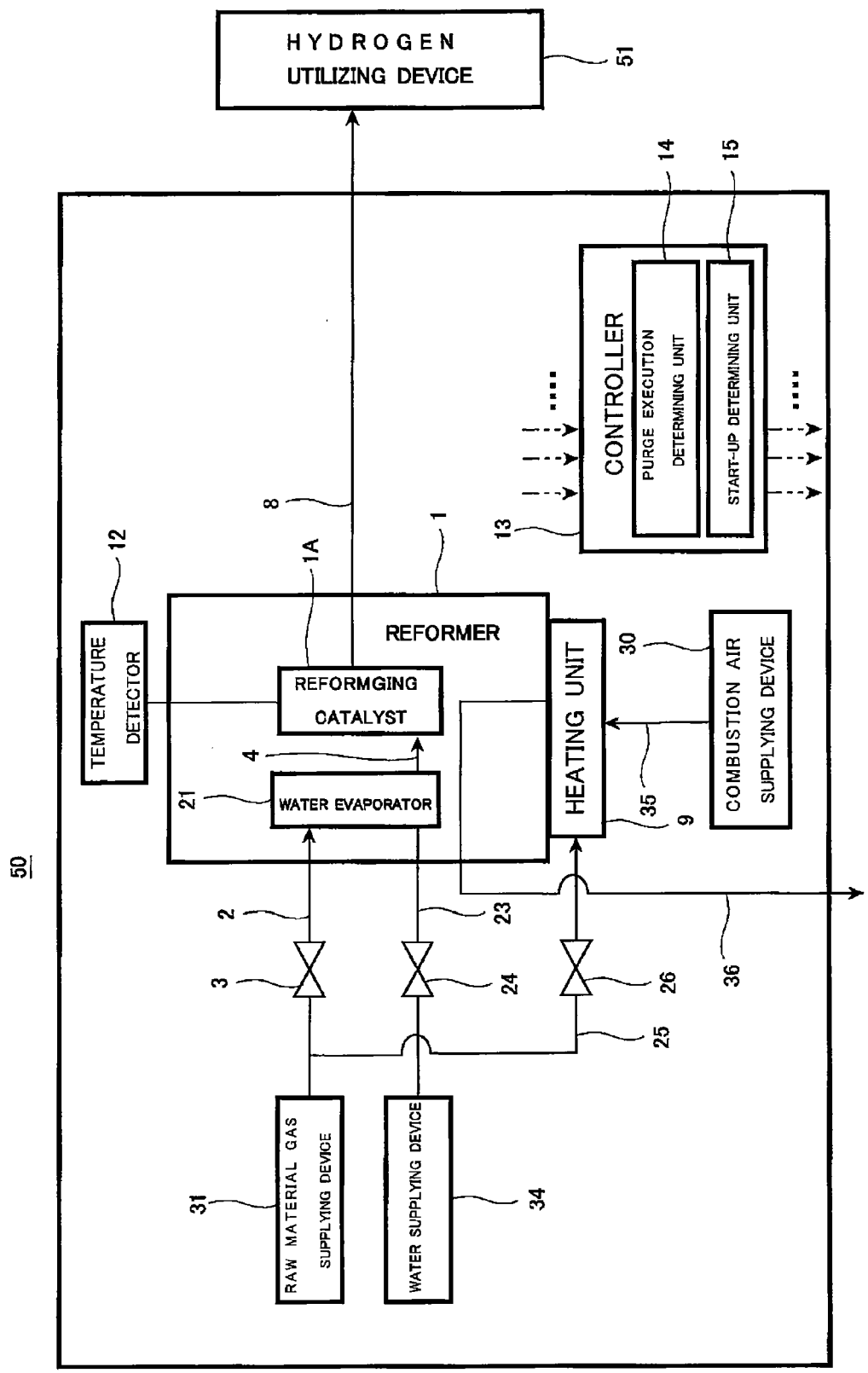
FIG. 7 is a block diagram schematically showing a schematic configuration of the hydrogen generator in Embodiment 5 of the present invention.

FIG. 7 is a block diagram schematically showing a schematic configuration of the hydrogen generator according to Embodiment 5 of the present invention. In FIG. 7, the same reference signs are used for the same or corresponding components as in FIG. 5, and a repetition of the same explanation is avoided.

As shown in FIG. 7, the hydrogen generator 50 according to Embodiment 5 of the present invention is the same in basic configuration as the hydrogen generator 50 according to Embodiment 4 but is different from the hydrogen generator 50 according to Embodiment 4 in that: the hydrogen generator 50 according to Embodiment 5 includes a heating unit 9 and a combustion air supplying device 30; the steam supplying device 32 is constituted by a water supplying device 34, the water on-off valve 24, the water supplying passage 23, and the water evaporator 21; and the raw material gas supplying device 31 serves as the purge gas supplying device.

Specifically, the water supplying device 34 is connected to the water evaporator 21 via the water supplying passage 23. The water supplying device 34 is configured to supply the water, purified by a purifier, from the water supply source (such as a water system or a water tank) to the water evaporator 21 while adjusting the flow rate of the water. The water supplying device 34 may be any device as long as it can supply water while adjusting the flow rate of the water and can stop supplying the water. For example, the water supplying device 34 may be constituted by a flow rate control valve or a combination of a pump and a flow rate control valve.

The water on-off valve 24 is disposed on a portion of the water supplying passage 23. The water on-off valve 24 may be any device as long as it can allow and stop the flow of the water in the water supplying passage 23. For example, the water on-off valve 24 may be constituted by an on-off valve.

Moreover, the raw material gas supplying device 31 is connected to the water evaporator 21 via the raw material gas supplying passage 2. The water evaporator 21 is configured to heat the water supplied from the water supplying device 34 through the water supplying passage 23 to generate the steam and also heat the raw material gas supplied from the raw material gas supplying device 31 through the raw material gas supplying passage 2. Further, the reforming catalyst 1A is connected to the water evaporator 21 via the steam supplying passage 4.

The raw material gas on-off valve 3 is disposed on the raw material gas supplying passage 2. The raw material gas on-off valve 3 may be any device as long as it is configured to allow and stop the flow of the raw material gas in the raw material gas supplying passage 2. For example, the raw material gas on-off valve 3 may be constituted by an on-off valve.

Moreover, an upstream end of the combustion gas supplying passage 25 is connected to a portion of the raw material gas supplying passage 2, the portion being located upstream of the raw material gas on-off valve 3. A downstream end of the combustion gas supplying passage 25 is connected to the heating unit (herein, burner) 9. The combustion gas on-off valve 26 is disposed on a portion of the combustion gas supplying passage 25. The combustion gas on-off valve 26 may be any device as long as it is configured to allow or stop the flow of the raw material gas in the combustion gas supplying passage 25. For example, the combustion gas on-off valve 26 may be constituted by an on-off valve. Moreover, the combustion air supplying device (combustion fan) 30 is connected to the heating unit 9 via a combustion air supplying passage 35.

With this, the raw material gas is supplied to the heating unit 9 as the combustion fuel from the raw material gas supplying device 31 through the raw material gas supplying passage 2 and the combustion gas supplying passage 25, and the combustion air is supplied to the heating unit 9 from the combustion air supplying device 30 through the combustion air supplying passage 35. In the heating unit 9, the supplied raw material gas and combustion air are combusted to generate a flue gas. The generated flue gas flows through a flue gas passage 36 to be discharged to the outside of the hydrogen generator 50. The flue gas heats the reforming catalyst 1A and the water evaporator 21 while flowing through the flue gas passage 36. Moreover, when the heating unit 9 does not carry out a combustion operation, the combustion air supplying device 30 serves as a cooling unit configured such that the air supplied through the heating unit 9 to the flue gas passage 36 cools down the reforming catalyst 1A while flowing through the flue gas passage 36.

Moreover, the controller 13 includes the purge execution determining unit 14 and the start-up determining unit 15. The purge execution determining unit 14 and the start-up determining unit 15 are realized by predetermined software stored in the internal memory. For example, the controller 13 may be configured such that the internal memory (not shown) thereof is flagged in a case where the reformer 1 is purged after a fuel gas generation stop command of the hydrogen generator 50 is input to the controller 13 (in a case where an operation command is output to the purge gas supplying device (raw material gas supplying device 31 in Embodiment 4), and the reformer 1 is purged). In this case, when an operation start command of the hydrogen generator 50 is input to the controller 13, the purge execution determining unit 14 may determine that the reformer 1 has been purged in a case where the internal memory is flagged and determine that the reformer 1 has not been purged in a case where the internal memory is not flagged. Moreover, for example, the start-up determining unit 15 may determine to start the start-up of the hydrogen generator 50 when a start-up command of the hydrogen generator 50 is input to the controller 13 from a remote controller, not shown, and may determine to start the start-up the hydrogen generator 50 when the start-up command of the hydrogen generator 50 is input to the controller 13 from a remote controller, not shown, and respective devices constituting the hydrogen generator 50 have no abnormalities (abnormalities are resolved).

Operations of Hydrogen Generator

Next, operations of the hydrogen generator 50 according to Embodiment 5 will be explained in reference to FIGS. 8 and 9.

Figure 8:
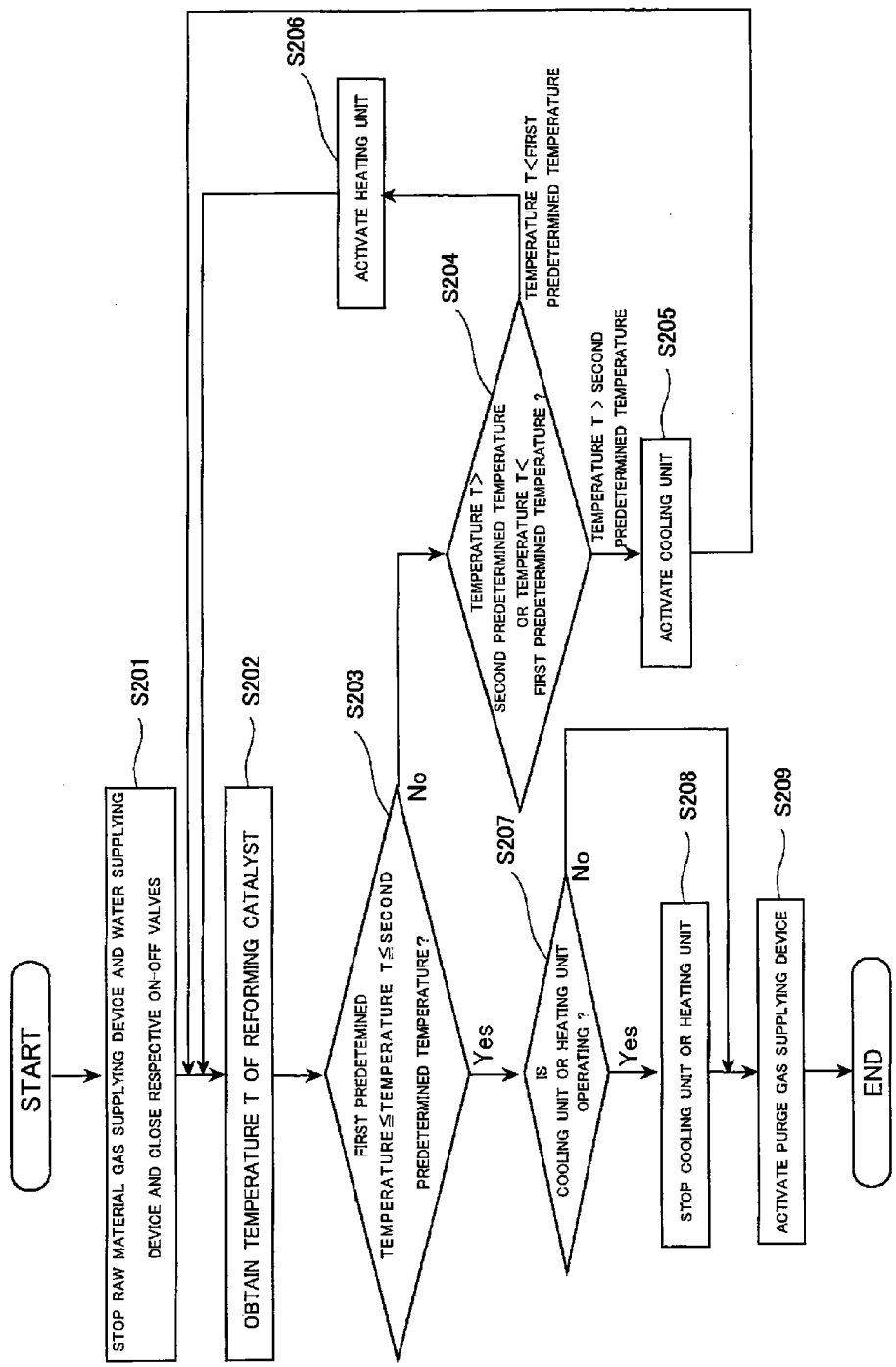
FIG. 8 is a flow chart schematically showing an outline of the stop operation (stop process) of the hydrogen generator in Embodiment 5.

FIG. 8 is a flow chart schematically showing an outline of the stop operation (stop process) of the hydrogen generator 50 according to Embodiment 5.

First, the hydrogen generator 50 carries out the hydrogen generating operation. Then, for example, when the operation stop command is input to the controller 13 by operating a remote controller, not shown, by a user, the controller 13 outputs a stop command to the raw material gas supplying device 31 and the water supplying device 34 and outputs a close command to the raw material gas on-off valve 3, the water on-off valve 24, and the combustion gas on-off valve 26 as shown in FIG. 8 (Step S201). With this, the supply of the raw material gas and steam to the reforming catalyst 1A of the reformer 1 stops, and the supply of the fuel gas to the hydrogen utilizing device 51 stops. The fuel gas containing the carbon monoxide remains in the reformer 1, and the reformer 1 is cooled down by natural radiational cooling.

Next, the controller 13 obtains the temperature T of the reforming catalyst 1A from the temperature detector 12 (Step S202) and determines whether or not the temperature T obtained in Step S202 is not lower than the first predetermined temperature and not higher than the second predetermined temperature (Step S203). Here, the second predetermined temperature may be defined as a temperature lower than the temperature at which carbon contained in the raw material gas is deposited on the reforming catalyst 1A. For example, the second predetermined temperature may be 300° C.

When the temperature T is higher than the second predetermined temperature or when the temperature T is lower than the first predetermined temperature (No in Step S203), the controller 13 proceeds to Step S204. When the temperature T is not lower than the first predetermined temperature and not higher than the second predetermined temperature (Yes in Step S203), the controller 13 proceeds to Step S207.

In Step S204, the controller 13 determines whether the temperature T is higher than the second predetermined temperature or not and whether the temperature T is lower than the first predetermined temperature or not. When the temperature T is higher than the second predetermined temperature, the controller 13 activates the combustion air supplying device 30 that is the cooling unit (Step S205). With this, the air is supplied from the combustion air supplying device 30 through the combustion air supplying passage 35 and the heating unit 9 to the flue gas passage 36. The air supplied to the flue gas passage 36 cools down the reforming catalyst 1A while flowing through the flue gas passage 36. In Embodiment 5, the combustion air supplying device 30 that is the cooling unit is activated to cool down the reforming catalyst 1A. However, the present embodiment is not limited to this. The reforming catalyst 1A may be cooled down by natural radiational cooling.

In contrast, when the temperature T is lower than the first predetermined temperature, the controller 13 activates the heating unit 9 (Step S206). Specifically, the controller 13 activates the raw material gas supplying device 31 and the combustion air supplying device 30 and opens the combustion gas on-off valve 26 to supply the raw material gas as the combustion fuel and the combustion air to the heating unit 9. Then, the heating unit 9 combusts the supplied raw material gas and combustion air to generate the flue gas. The generated flue gas is supplied to the flue gas passage 36. The flue gas supplied to the flue gas passage 36 heats the reforming catalyst 1A while flowing through the flue gas passage 36.

Thus, the controller 13 repeats Step S202 to Step S206 until the temperature T of the reforming catalyst 1A becomes not lower than the first predetermined temperature and not higher than the second predetermined temperature.

In Step S207, the controller 13 determines whether or not the combustion air supplying device 30 that is the cooling unit or the heating unit 9 is operating. When the combustion air supplying device 30 or the heating unit 9 is operating (Yes in Step S207), the controller 13 stops the combustion air supplying device 30 or the heating unit 9 (Step S208) and proceeds to Step S209. In contrast, when the combustion air supplying device 30 or the heating unit 9 is not operating (No in Step S207), the controller 13 proceeds to Step S209. The heating unit 9 is stopped by stopping the raw material gas supplying device 31 and the combustion air supplying device 30 and closing the combustion gas on-off valve 26.

In Step S209, the controller 13 activates the raw material gas supplying device 31 that is the purge gas supplying device. Specifically, the controller 13 activates the raw material gas supplying device 31 and opens the raw material gas on-off valve 3. With this, the raw material gas supplying device 31 supplies the raw material gas as the purge gas through the raw material gas supplying passage 2 to the reformer 1. In the reformer 1, the fuel gas in the reformer 1 is purged with the purge gas (raw material gas) supplied from the raw material gas supplying device 31.

After the reformer 1 is purged with the purge gas, the controller 13 stops the raw material gas supplying device 31 and closes the raw material gas on-off valve 3 to terminate the present program.

As above, the hydrogen generator 50 according to Embodiment 5 is configured to such that the reformer 1 is purged with the raw material gas when the temperature of the reforming catalyst 1A is not lower than the first predetermined temperature and not higher than the second predetermined temperature. On this account, the decomposition reaction of the compound of the nickel and the carbon monoxide is carried out. Thus, the discharge of the compound of the nickel and the carbon monoxide to the outside of the reformer 1, that is, to the outside of the hydrogen generator 50 can be suppressed, and the reduction in amount of the nickel in the reforming catalyst 1A can be suppressed. Moreover, the deposition of carbon derived from the raw material gas on the reforming catalyst 1A can be suppressed. Therefore, in the hydrogen generator 50 according to Embodiment 5, the performance deterioration of the reformer 1 can be suppressed.

Next, a start-up operation of the hydrogen generator 50 according to Embodiment 5 will be explained in reference to FIG. 9.

Figure 9:
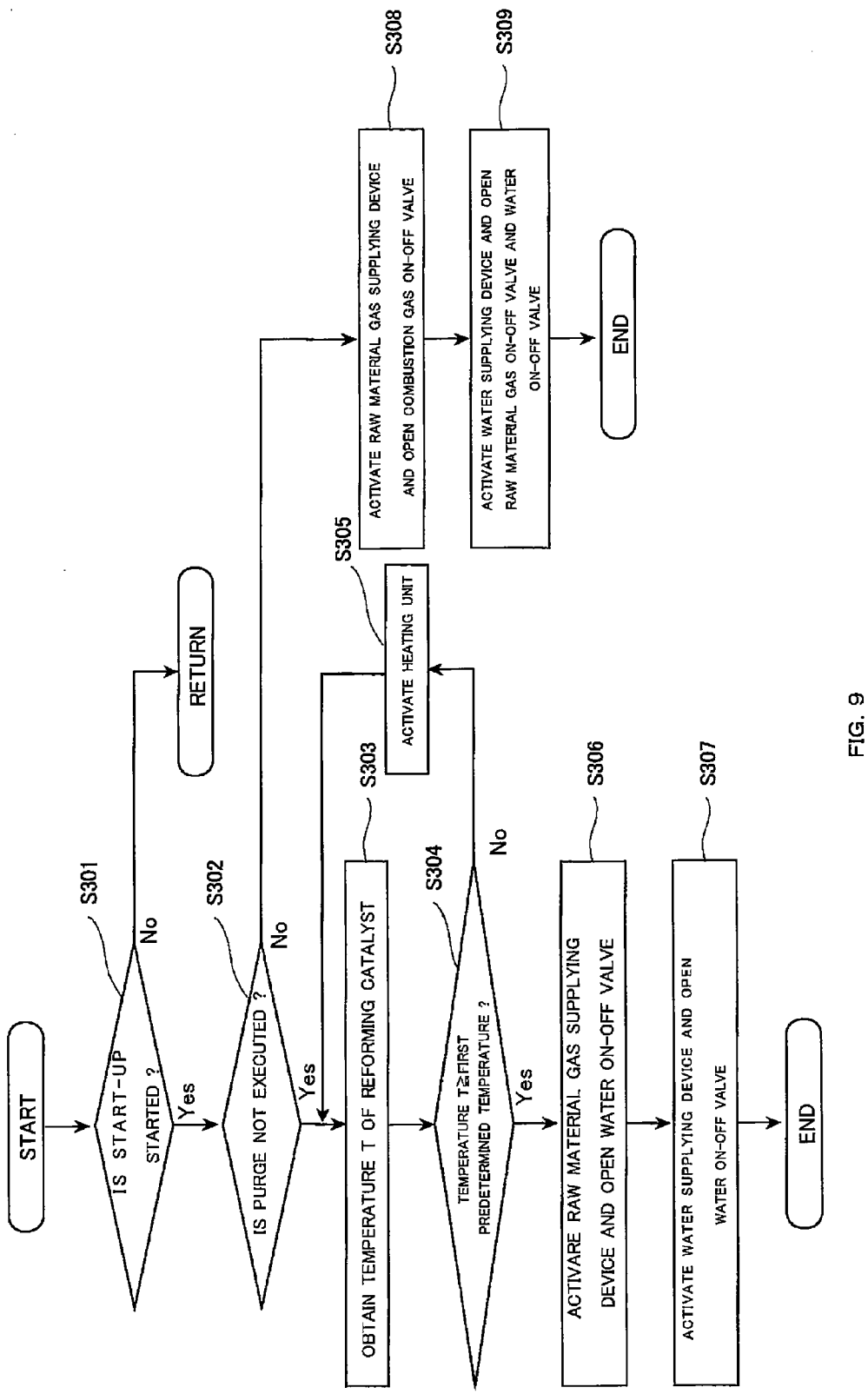
FIG. 9 is a flow chart schematically showing a start-up operation (start-up process) of the hydrogen generator in Embodiment 5.

FIG. 9 is a flow chart schematically showing the start-up operation (start-up process) of the hydrogen generator 50 according to Embodiment 5.

As shown in FIG. 9, when a start-up start command is input to the controller 13 by operating a remote controller, not shown, by a user, the start-up determining unit 15 determines whether to start the start-up of the hydrogen generator 50 (Step S301). For example, when the start-up start command is input to the controller 13 or when the abnormalities of respective devices constituting the hydrogen generator 50 are resolved, the start-up determining unit 15 determines to start the start-up of the hydrogen generator 50 (Yes in Step S301), and the controller 13 proceeds to Step S302. When the start-up start command is not input to the controller 13 or when the abnormalities of respective devices constituting the hydrogen generator 50 are not resolved, the start-up determining unit 15 determines not to start the start-up of the hydrogen generator 50 (No in Step S301), and the controller 13 repeats Step S301 until the start-up start command is input to the controller 13 or until the abnormality of the hydrogen generator 50 is resolved.

In Step S302, the purge execution determining unit 14 of the controller 13 determines whether or not the reformer 1 has been purged after the previous stop of the fuel gas generation in the hydrogen generator 50 (reformer 1). One example of a case where the reformer 1 has not been purged after the previous stop of the fuel gas formation in the reformer 1 is a case where electric power outage has occurred during the operation (fuel gas generation) of the hydrogen generator 50.

When the purge execution determining unit 14 determines that the purge has been executed (No in Step S302), the controller 13 proceeds to Step S308. When the purge execution determining unit 14 determines that the purge has not been executed (Yes in Step S302), the controller 13 proceeds to Step S303.

In Step S303, the controller 13 obtains the temperature T of the reforming catalyst 1A from the temperature detector 12. Then, the controller 13 determines whether or not the temperature T obtained in Step S303 is the first predetermined temperature or higher (Step S304). When the temperature T is lower than the first predetermined temperature (No in Step S304), the controller 13 activates the heating unit 9. One example of a case where the reformer 1 has not been purged and the temperature of the reforming catalyst 1A is lower than the first predetermined temperature is a case where electric power outage has occurred during the operation of the hydrogen generator 50 and it has taken time to restore electric power.

Specifically, the controller 13 activates the raw material gas supplying device 31 and the combustion air supplying device 30 and opens the combustion gas on-off valve 26 to supply the raw material gas as the combustion fuel and the combustion air to the heating unit 9. In the heating unit 9, the supplied raw material gas and combustion air are combusted to generate the flue gas. The generated flue gas is supplied to the flue gas passage 36. The flue gas supplied to the flue gas passage 36 heats the reforming catalyst 1A while flowing through the flue gas passage 36. Thus, the controller 13 repeats Step S303 to Step S305 until the temperature T of the reforming catalyst 1A becomes the first predetermined temperature or higher.

In contrast, when the temperature T is the first predetermined temperature or higher (Yes in Step S304), the controller 13 proceeds to Step S306. With this, the reforming catalyst 1A of the reformer 1 becomes the first predetermined temperature or higher, and the compound of the carbon monoxide contained in the fuel gas remaining in the reformer 1 and the nickel is decomposed.

In Step S306, the controller 13 activates the raw material gas supplying device 31 and opens the raw material gas on-off valve 3. With this, the raw material gas is supplied as the purge gas from the raw material gas supplying device 31 through the raw material gas supplying passage 2 to the reformer 1, and the fuel gas remaining in the reformer 1 is purged with the raw material gas.

Next, when the reformer 1 is purged with the raw material gas and the temperature of the reforming catalyst 1A of the reformer 1 becomes a temperature (for example, 280° C.) adequate for the reforming reaction, the controller 13 activates the water supplying device 34 and opens the water on-off valve 24 (Step S307) to terminate the present program.

With this, the supply of the raw material gas and water to the reformer 1 starts. In the reformer 1, the supplied raw material gas and water are supplied to the water evaporator 21. In the water evaporator 21, the supplied water is heated to generate the steam, and the raw material gas is heated. The generated steam and the heated raw material gas are supplied through the steam supplying passage 4 to the reforming catalyst 1A. In the reforming catalyst 1A, the reforming reaction between the supplied raw material gas and steam is carried out to generate the fuel gas. Then, the generated fuel gas is supplied to the hydrogen utilizing device 51.

In contrast, as described above, when the purge execution determining unit 14 determines that the purge has been executed (No in Step S302), the controller 13 activates the raw material gas supplying device 31 and the combustion air supplying device 30 and opens the combustion gas on-off valve 26 (Step S308). With this, the raw material gas as the combustion fuel and the combustion air are supplied to the heating unit 9. In the heating unit 9, the supplied raw material gas and combustion air are combusted to generate the flue gas. The generated flue gas is supplied to the flue gas passage 36. The flue gas supplied to the flue gas passage 36 heats the reforming catalyst 1A while flowing through the flue gas passage 36.

Next, when the temperature of the reforming catalyst 1A of the reformer 1 becomes a temperature (for example, 280° C.) adequate for the reforming reaction, the controller 13 activates the water supplying device 34 and opens the raw material gas on-off valve 3 and the water on-off valve 24 (Step S307) to terminate the present program.

With this, the supply of the raw material gas and water to the reformer 1 starts. In the reformer 1, the supplied raw material gas and water are supplied to the water evaporator 21. In the water evaporator 21, the supplied water is heated to generate the steam, and the raw material gas is heated. The generated steam and the heated raw material gas are supplied through the steam supplying passage 4 to the reforming catalyst 1A. In the reforming catalyst 1A, the reforming reaction between the supplied raw material gas and steam is carried out to generate the fuel gas. The generated fuel gas is supplied to the hydrogen utilizing device 51.

As above, in the hydrogen generator 50 according to Embodiment 5, when the reformer 1 has not been purged after the previous stop of the fuel gas generation in the reformer 1 and the temperature of the reforming catalyst 1A is lower than the first predetermined temperature, the reforming catalyst 1A is heated such that the temperature thereof becomes the first predetermined temperature or higher. With this, the decomposition reaction of the compound of the nickel and the carbon monoxide is carried out. Thus, the discharge of the compound of the nickel and the carbon monoxide to the outside of the reformer 1, that is, to the outside of the hydrogen generator 50 can be suppressed. Therefore, in the hydrogen generator 50 according to Embodiment 5, the reduction in amount of the nickel in the reforming catalyst 1A can be suppressed.

In the hydrogen generator 50 according to Embodiment 5, the burner is used as the heating unit 9. However, the present embodiment is not limited to this. An electric heater may be used as the heating unit 9.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

The hydrogen generator according to the present invention and the method for operating the hydrogen generator can suppress the performance deterioration of the reforming catalyst by purging the reformer with the purge gas when the temperature of the reforming catalyst is the first predetermined temperature or higher. Therefore, the hydrogen generator according to the present invention and the method for operating the hydrogen generator are useful in a fuel cell field.

The invention claimed is:

1. A hydrogen generator comprising:
    a reformer including a reforming catalyst containing nickel and configured to generate a hydrogen-rich fuel gas by using a raw material and steam;
    a temperature detector configured to detect a temperature of the reforming catalyst;
    a purge gas supplying device configured to supply a purge gas to the reformer; and a controller,
    wherein the controller controls the purge gas supplying device such that the reformer is purged with the purge gas when the temperature detected by the temperature detector is a first predetermined temperature or higher,
    wherein the first predetermined temperature is a temperature at which a decomposition rate of a compound comprising the nickel and carbon monoxide contained in the fuel gas is higher than a generation rate of the compound.

2. The hydrogen generator according to claim 1, wherein the first predetermined temperature is 150° C.

3. The hydrogen generator according to claim 1, wherein the purge gas supplying device comprises a raw material supplying device configured to supply the raw material to the reformer.

4. The hydrogen generator according to claim 3, wherein the controller purges the reformer with the raw material when the temperature detected by the temperature detector is not higher than a second predetermined temperature and not lower than the first predetermined temperature.

5. The hydrogen generator according to claim 4, further comprising a cooling unit configured to cool down the reforming catalyst, wherein the controller cools down the reforming catalyst by using the cooling unit when the temperature detected by the temperature detector is higher than the second predetermined temperature.

6. The hydrogen generator according to claim 4, wherein the second predetermined temperature is a temperature lower than a temperature at which carbon contained in the raw material is deposited on the reforming catalyst.

7. The hydrogen generator according to claim 6, wherein the second predetermined temperature is 300° C.

8. The hydrogen generator according to claim 2, further comprising:
    a heating unit configured to heat the reforming catalyst; and
    a purge execution determining unit configured to determine whether or not the purge has been executed,
    wherein when the purge execution determining unit determines that the purge has not been executed and the temperature detector detects a temperature lower than the first predetermined temperature, the controller heats the reforming catalyst by the heating unit until the temperature detector detects a temperature equal to or higher than the first predetermined temperature, and the controller then causes the purge gas supplying device to purge the reformer.

9. The hydrogen generator according to claim 3, further comprising:
    a heating unit configured to heat the reforming catalyst; and
    a purge execution determining unit configured to determine whether or not the purge has been executed,
    wherein when the purge execution determining unit determines that the purge has not been executed and the temperature detector detects a temperature lower than the first predetermined temperature, the controller heats the reforming catalyst by the heating unit until the temperature detector detects a temperature not lower than the first predetermined temperature and not higher than a second predetermined temperature, and the controller then causes the raw material supplying device to purge the reformer with the raw material.

10. The hydrogen generator according to claim 8, wherein the heating unit comprises a heater configured to perform heating by supply of electricity; and
    when the purge execution determining unit determines that the purge has not been executed, and the temperature detector detects a temperature lower than the first predetermined temperature, the controller supplies the electricity to the heater to heat the reforming catalyst.

11. The hydrogen generator according to claim 8, wherein the heating unit comprises a combustor configured to heat the reforming catalyst, the hydrogen generator further comprising
    a combustion gas supplying device configured to supply a combustion gas to the combustor,
    wherein when the purge execution determining unit determines that the purge has not been executed and the temperature detector detects a temperature lower than the first predetermined temperature, the controller combusts the combustion gas in the combustor to heat the reforming catalyst, the combustion gas being supplied through the combustion gas supplying passage.

12. The hydrogen generator according to claim 8, wherein when the purge has not been executed after a previous stop of fuel gas generation in the reformer, the purge execution determining unit determines that the purge has not been executed.

13. The hydrogen generator according to claim 8, further comprising a start-up determining unit configured to determine whether to start up the hydrogen generator to start fuel gas generation,
wherein the controller heats the reforming catalyst by the heating unit when the purge execution determining unit determines that the purge has not been executed, the start-up determining unit determines to start up the reformer, and the temperature detector detects a temperature lower than the first predetermined temperature.

14. A method for operating a hydrogen generator including:
a reformer including a reforming catalyst containing nickel and configured to generate a hydrogen-rich fuel gas by using a raw material and steam;
a temperature detector configured to detect a temperature of the reforming catalyst; and
a purge gas supplying device configured to supply a purge gas to the reformer, the method comprising the steps of:
(A) detecting the temperature of the reforming catalyst by the temperature detector;
(B) determining whether or not the temperature detected by the temperature detector is a first predetermined temperature or higher; and
(C) supplying the purge gas by the purge gas supplying device to the reformer when it is determined in Step (B) that the temperature detected by the temperature detector is the first predetermined temperature or higher,
wherein the first predetermined temperature is a temperature at which a decomposition rate of a compound comprising the nickel and carbon monoxide contained in the fuel gas is higher than a generation rate of the compound.

15. The hydrogen generator according to claim 9, wherein the heating unit comprises a heater configured to perform heating by supply of electricity; and
when the purge execution determining unit determines that the purge has not been executed, and the temperature detector detects a temperature lower than the first predetermined temperature, the controller supplies the electricity to the heater to heat the reforming catalyst.

16. The hydrogen generator according to claim 9, wherein the heating unit comprises a combustor configured to heat the reforming catalyst, the hydrogen generator further comprising a combustion gas supplying device configured to supply a combustion gas to the combustor,
wherein when the purge execution determining unit determines that the purge has not been executed and the temperature detector detects a temperature lower than the first predetermined temperature, the controller combusts the combustion gas in the combustor to heat the reforming catalyst, the combustion gas being supplied through the combustion gas supplying passage.

17. The hydrogen generator according to claim 9, wherein when the purge has not been executed after a previous stop of fuel gas generation in the reformer, the purge execution determining unit determines that the purge has not been executed.

18. The hydrogen generator according to claim 9, further comprising a start-up determining unit configured to determine whether to start up the hydrogen generator to start fuel gas generation,
wherein the controller heats the reforming catalyst by the heating unit when the purge execution determining unit determines that the purge has not been executed, the start-up determining unit determines to start up the reformer, and the temperature detector detects a temperature lower than the first predetermined temperature.

* * * * *